United States Patent
Noff et al.

(10) Patent No.: US 6,682,760 B2
(45) Date of Patent: Jan. 27, 2004

(54) CROSS-LINKED COLLAGEN MATRICES AND METHODS FOR THEIR PREPARATION

(75) Inventors: Matitiau Noff, Tel Aviv (IL); Shahar Pitaru, Givataim (IL)

(73) Assignee: Colbar R&D Ltd., Ramat Hasharon (IL)

( * ) Notice: Subject to any disclaimer, the term of this patent is extended or adjusted under 35 U.S.C. 154(b) by 0 days.

(21) Appl. No.: 09/828,189

(22) Filed: Apr. 9, 2001

(65) Prior Publication Data

US 2002/0019516 A1 Feb. 14, 2002

Related U.S. Application Data

(60) Provisional application No. 60/197,989, filed on Apr. 18, 2000.

(51) Int. Cl.[7] .................................................. A61K 9/14
(52) U.S. Cl. ..................... 424/484; 424/485; 424/486; 424/422; 424/423; 424/424; 514/2; 514/21
(58) Field of Search ....................... 514/2, 21; 424/422, 424/423, 424, 484, 485, 486, 488

(56) References Cited

U.S. PATENT DOCUMENTS

| | | | |
|---|---|---|---|
| 3,949,073 A | 4/1976 | Daniels et al. | |
| 4,331,766 A | 5/1982 | Becker et al. | |
| 4,582,640 A | 4/1986 | Smestad et al. | 260/123.7 |
| 4,725,671 A | 2/1988 | Chu et al. | |
| 4,961,707 A | 10/1990 | Magnusson et al. | |
| 4,971,954 A | 11/1990 | Brodsky et al. | 514/21 |
| 5,002,583 A | 3/1991 | Pitaru et al. | 623/66 |
| 5,206,028 A | 4/1993 | Li | |
| 5,292,362 A | 3/1994 | Bass et al. | |
| 5,565,519 A | * 10/1996 | Rhee et al. | 525/54.1 |
| 5,567,806 A | 10/1996 | Abdul-Malak et al. | |
| 5,700,479 A | 12/1997 | Lundgren et al. | 424/435 |
| 5,718,012 A | 2/1998 | Cavallaro | |

(List continued on next page.)

FOREIGN PATENT DOCUMENTS

| | | |
|---|---|---|
| DE | 43 02 708 | 8/1994 |
| EP | 0 693 523 | 1/1996 |
| FR | 2 679 778 | 2/1993 |

OTHER PUBLICATIONS

Tanaka S. et al., "Isolation and Characterization of Collagen Chains Dimerized by Sugar–derived Cross–links". The Journal of Biological Chemistry, 1988, vol. 263, No. 33, pp. 17, 650–17, 657, especially p. 17,651.

(List continued on next page.)

Primary Examiner—Thurman K. Page
Assistant Examiner—Liliana Di Nola-Baron
(74) Attorney, Agent, or Firm—Eitan, Pearl, Latzer & Cohen Zedek, LLP

(57) ABSTRACT

A method for preparing cross-linked collagen and cross-linked collagen products. The method includes incubating collagen in a solution including water, at least one polar solvent and at least one sugar, to form cross-linked collagen. The solution may include a buffer having a suitable pH and ionic strength. The method may include removing excess unreacted sugar(s) and polar solvent(s) by washing the cross-linked collagen or by other methods. The method may also include dehydrating the cross-linked collagen, and may include subjecting the cross-linked collagen to critical point drying, or subjecting the collagen to drying or freeze-drying prior to cross-linking. The collagen may be prepared from atelopeptide collagen to reduce antigenicity, but may also be prepared from other suitable collagen types. The concentration and type of the polar solvent(s), the concentration and type of the reducing sugar(s), and the incubation duration may be varied to control the degree of cross-linking. The cross-linked collagen product may be in the form of a wet or dry matrix or membrane or may be suspended in a liquid in the form of an injectable preparation. The method may be applied to collagenous proteins and collagen-like peptides.

65 Claims, 3 Drawing Sheets

U.S. PATENT DOCUMENTS

| | | |
|---|---|---|
| 5,837,278 A | 11/1998 | Geistlich et al. |
| 5,955,438 A | 9/1999 | Pitaru et al. .................. 514/21 |
| 5,972,385 A | 10/1999 | Liu et al. |
| 6,156,531 A | 12/2000 | Pathak et al. |
| 6,177,514 B1 | 1/2001 | Pathak et al. |
| 6,309,670 B1 | 10/2001 | Heidaran et al. |
| 6,346,515 B1 | 2/2002 | Pitaru et al. .................. 514/21 |

OTHER PUBLICATIONS

Gratzer P. et al., "Solvent Environment Modulates Effects of Glutaraldehyde Crosslinking on Tissue–Derived Biomaterials", Journal of Biomedical Materials Research, vol. 31, pp. 533–543, 1996, John Wiley & Sons, Inc.

Naimark et al., "HMDC crosslinking of bovine pericardial tissue: a potential role of the solvent environment in the design of bioprosthetic materials", Centre for Biomaterials, University of Toronto, Canada, 1995, Chapman & Hall, pp. 235–240.

J. M. Pachence, Collagen–Based Devices for Soft Tissue Repair, Journal of Biomedical Materials Research (Applied Biomaterials), vol. 33: 35–40 (1996).

R.R. Kohn, et al; Collagen Aging In Vitro by Nonenzymatic Glycosylation and Browning; Diabetes, vol. 33, Jan. 1984; pp. 57–59.

M. J. C. Kent, et al.; Evidence For Glucose–Mediated Covalent Cross–Linking of Collagen After Glycosylation In Vitro; Biochem. J; vol. 225; pp. 745–752; 1985.

Albert L. Lehninger, "The Molecular Basis of Cell Structure and Function", Biochemistry, Second Edition, Worth Publishers, Inc., 1975.

* cited by examiner

CROSS-LINKED COLLAGEN MATRICES AND METHODS FOR THEIR PREPARATION

This application claims the benefit of Provisional application No. 60/197,989 filed Apr. 18, 2000.

FIELD OF THE INVENTION

The present invention relates generally to cross-linked collagen matrices and preparations and more particularly to a novel method for cross linking collagen using reducing sugars and to cross linked collagen matrices and preparations formed by using this method.

BACKGROUND OF THE INVENTION

Collagens are key molecules of the animal kingdom accounting for approximately 25–30% of all proteins of mammalian organisms. Collagens are natural biopolymers that are organized as fibrillar networks and other forms of superstructures. The fibrillar collagens and particularly type I collagen have the highest incidence accounting for 80% of connective tissues proteins. The high incidence of the fibrillar collagens, their availability from animal sources and the ability to extract and prepare monomeric solutions of purified collagen which can be polymerized into three-dimensional fibrillar matrices make these collagens ideal candidates for natural biomaterials. In addition, the fibrillar collagens exhibit a high degree of conservation and are therefore weak antigens. The main antigenic sites of the fibrillar collagen molecules reside within the non-helical telopeptides which flank the helical portion of the molecule.

In vivo, the polymeric structure of the fibrillar collagens is stabilized by intermolecular cross-links, which are formed by an enzymatic process. Because of the staggered assembly of the collagen molecules, most of these cross-links bridge between the telopeptide domain of one molecule and the helical domain of an adjacent molecule. Additional cross-link formation by the process of glycation takes place as part of the collagen and connective tissues aging.

Glycation of proteins, including collagen, takes place as a physiological process of aging over the life course consequent to the exposure of proteins to glucose. It was found that glycated fibrillar collagens exhibit an increased level of cross-linking and therefore they are more resistant to degradation by collagenases, the specific enzymes which degrade collagen.

The process of glycation by glucose is slow because its physiological concentration in serum is relatively low and only a small proportion of it is found in the acyclic aldehyde form which is the reactive one. It was found that D(-)Ribose is 1000 folds more reactive than glucose in inducing glycation and cross-linking of collagen molecules in fibrillar collagens. For example, incubation of native fibrillar collagen in 0.2 M D(-)ribose for 5 days is equivalent to exposure to physiological concentration of glucose for 20 years. The cross-links produced by glycation bridge form mainly between the triple-helical domains of adjacent molecules.

The performance of collagen-based bioproducts depends on the one hand on controlling their functional longevity within the host and on the other hand on the preservation of the biological properties of the native collagen component. The functional longevity of the collagen component depends on its capacity to resist specific enzymatic degradation by collagenases (metaloproteinases). This capacity is directly related to the number of intramolecular and intermolecular cross-links within the collagen polymer. The higher the number of cross-links the higher the resistance to collagenase degradation.

Exemplary cross-linking agents of choice known in the art have been glutaraldehyde and other related non-physiological agents. These cross-linking agents react with amino acid residues of the collagen molecule to form intermolecular cross-links. However, these harsh agents may have negative effects on the biocompatibility and biological activity of cross-linked collagen-based bioproducts that are caused by alterations in the conformation of the collagen molecule and leaching out of the cross-linking agents. Thus, collagen products cross-linked by non-physiological agents are poorly accepted by and integrated within the host tissues. Furthermore, localized inflammation and more complex systemic reactions are disadvantageous side effects of glutaraldehyde cross-linked collagen products.

U.S. Pat. No. 4,971,954 to Brodsky et al. discloses the use of D(-)Ribose or other reducing physiological sugars as physiological agents for cross-linking collagen matrices by the process of glycation. However, the method disclosed by Brodsky et al. is efficient when the collagenous substrate consists of native collagen fibers, but is only partially effective for collagen matrices produced from reconstituted fibrillar collagen, particularly when the collagen is atelopeptide collagen. Atelopeptide collagen is produced by pepsin-solubilization of native collagen. Since pepsin cuts off the telopeptides of the collagen molecule which are antigenic, pepsin-solubilized collagen is the most utilized form of collagen in the biomedical industry.

In the method disclosed by Brodsky et al in U.S. Pat. No. 4,971,954, the cross-linking occurs by a process of glycation. In this process the acyclic form of D(-)Ribose condenses spontaneously with the $\epsilon$-amino groups of lysyl and hydroxylysyl residues located in the triple helical domain of the collagen molecule. The condensation product is a Schiff base that undergoes Amadori rearrangement to form a ketoamine adduct. Ketoamines located on adjacent collagen molecules condense to form covalent cross-links, the exact nature of which has yet not been determined, even though fluorescent heterocyclic structures and others type have been recently proposed.

Brodsky et al. disclose the process of glycation for native fibrillar type I collagen, such as for example the native fibrillar type I collagen from rat tendon. However, cross-linking by the glycation method of Brodsky et al. is reversible. For example, in an article entitled "ISOLATION AND PARTIAL CHARACTERIZATION OF COLLAGEN CHAINS DIMERIZED BY SUGAR-DERIVED CROSS-LINKS", published in *The Journal of Biological Chemistry* Vol. 263(33), pp. 17650–17657, 1988, Tanaka et al. show that rat tendon collagen cross-linked with D(-)Ribose for 1 day, is in the range of 50% reversibility at the end of a period of 5 days.

U.S. Pat. No. 5,955,438 to Pitaru et al. discloses, inter alia, a method for preparation of collagen matrices and membranes made from atelopeptide reconstituted collagen fibrils formed into a membrane and then cross-linked by a reducing sugar such as D(-)Ribose. The membrane or the implants made thereof are then subjected to critical point drying for drying and sterilization while preserving the three dimensional shape of the implants. The critical point drying procedure improves the resistance of the collagen matrix to collagenase degradation.

The cross-linking of native collagen with D(-)Ribose renders the native collagen fibers resistant to collagenase degradation. However, cross-linking of atelopeptide reconstituted collagen fibrils by D(−)Ribose is only negligibly effective in increasing their resistance to collagenase degradation. The reason for this is not clear. Since work by Tanaka et al. (see reference list) indicates that ribose-induced cross-links between native collagen molecules occur mainly between the triple-helical portions of adjacent collagen molecules, the removal of the telopeptides should not affect the degree of cross-linking of atelopeptide collagen. One possible explanation is that the packing of the atelopeptide collagen molecules in reconstituted collagen fibrils differs from the packing in native collagen fibrils (as discussed in Ref. 16 of the reference list). This difference in packing, in turn, may result in a change in the intermolecular distance or alignment which may cause a decrease in the strength or number of the covalent cross-links formed by D(−)Ribose.

SUMMARY OF THE INVENTION

There is therefore provided, in accordance with a preferred embodiment of the present invention, a method for preparing cross-linked collagen. The method includes the step of incubating collagen in a solution including water, at least one polar solvent, and at least one sugar, to form cross-linked collagen.

Furthermore, in accordance with another preferred embodiment of the present invention, the sugar is a reducing sugar.

Furthermore, in accordance with another preferred embodiment of the present invention, the polar solvent is an organic polar solvent.

Furthermore, in accordance with another preferred embodiment of the present invention, the organic polar solvent is an alcohol.

Furthermore, in accordance with another preferred embodiment of the present invention, the organic polar solvent is selected from the group consisting of methanol, ethanol, propanol, isopropanol acetone, tetrahydrofuran, dimethylsulfoxide, and combinations thereof.

Furthermore, in accordance with another preferred embodiment of the present invention, the polar solvent is miscible in water.

Furthermore, in accordance with another preferred embodiment of the present invention, the solution is a buffered solution including a buffer.

Furthermore, in accordance with another preferred embodiment of the present invention, the solution includes phosphate buffered saline.

Furthermore, in accordance with another preferred embodiment of the present invention, the solution includes water in the range of 15%–95% (v/v), at least one polar solvent in the range of 5%–85% (v/v), and a buffer.

Furthermore, in accordance with another preferred embodiment of the present invention, the collagen is selected from, native collagen, fibrillar collagen, fibrillar atelopeptide collagen, lyophylized collagen, collagen obtained from animal sources, human collagen, recombinant collagen, pepsinized collagen, reconstituted collagen, and combinations thereof.

Furthermore, in accordance with another preferred embodiment of the present invention, the collagen comprises fibrillar collagen reconstituted from monomolecular atelopeptide collagen.

Furthermore, in accordance with another preferred embodiment of the present invention, the collagen is obtained by reconstituting monomolecular atelopeptide collagen obtained by proteolytic digestion of native collagen.

Furthermore, in accordance with another preferred embodiment of the present invention, the sugar is a compound represented by one of the following formulae I or II:

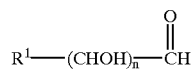

(I)

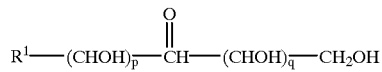

(II)

wherein:
R$^1$ is H or lower alkyl or alkylene, an amino acid, a peptide, a saccharide, a purine or a pyrimidine base, a phosphorylated purine or pyrimidine base;
n is an integer between 2–9, and
p and q are each independently an integer between 0–8, and the sum of p and q is at least 2 and not more than 8.

Furthermore, in accordance with another preferred embodiment of the present invention, the sugar is a naturally occurring reducing sugar.

Furthermore, in accordance with another preferred embodiment of the present invention, the sugar is a diose, a triose, a tetrose, a pentose, a hexose, a septose, an octose, a nanose, or a decose.

Furthermore, in accordance with another preferred embodiment of the present invention, the sugar is selected from the group consisting of glycerose, threose, erythrose, lyxose, xylose, arabinose, ribose, allose, altrose, glucose, mannose, gulose, idose, galactose and talose.

Furthermore, in accordance with another preferred embodiment of the present invention, the sugar is a disaccharide.

Furthermore, in accordance with another preferred embodiment of the present invention, the disaccharide is selected from the group consisting of maltose, lactose, sucrose, cellobiose, gentiobiose, melibiose, turanose, and trehalose.

Furthermore, in accordance with another preferred embodiment of the present invention, at least one substance is added to the solution in which the step of incubating is performed, the substance becoming immobilized within the matrix.

Furthermore, in accordance with another preferred embodiment of the present invention, the substance is selected from the group consisting of an antimicrobial agent, an anti-inflammatory agent, a factor having tissue inductive properties, and combinations thereof.

Furthermore, in accordance with another preferred embodiment of the present invention, the sugar is D(−) ribose, and the polar solvent is ethanol.

Furthermore, in accordance with another preferred embodiment of the present invention, the solution includes water in the range of 15%–95% (v/v) and ethanol in the range of 5%–85% (v/v).

Furthermore, in accordance with another preferred embodiment of the present invention, the solution includes water in the range of 25%–50% (v/v) and ethanol in the range of 50%–75% (v/v).

Furthermore, in accordance with another preferred embodiment of the present invention, the solution includes about 30% water (v/v), and about 70% ethanol (v/v).

Furthermore, in accordance with another preferred embodiment of the present invention, the concentration of D(−)ribose in the solution is in the range of 0.1%–5% (w/v).

Furthermore, in accordance with another preferred embodiment of the present invention, the concentration of D(−)ribose in the solution is in the range of 0.5%–3% (w/v).

Furthermore, in accordance with another preferred embodiment of the present invention, the method further includes the step of washing the cross-linked collagen after the step of incubating, to remove the polar solvent and excess of the sugar.

Furthermore, in accordance with another preferred embodiment of the present invention, the method further includes the step of dehydrating the cross-linked collagen.

Furthermore, in accordance with another preferred embodiment of the present invention, the method further includes the step of subjecting the cross-linked collagen to critical point drying.

Furthermore, in accordance with another preferred embodiment of the present invention, the method further includes the step of drying or freeze-drying the collagen prior to the step of incubating.

Furthermore, in accordance with another preferred embodiment of the present invention, the method further includes the step of drying or freeze-drying the cross-linked collagen.

There is also provided, in accordance with another preferred embodiment of the present invention, a cross-linked collagen preparation prepared by the method disclosed hereinabove.

There is also provided, in accordance with another preferred embodiment of the present invention, a method for preparing cross-linked collagen. The method includes the step of incubating collagen in a solution including water, at least one hydrophilic solvent and at least one sugar to form the cross-linked collagen.

Furthermore, in accordance with another preferred embodiment of the present invention, the method further includes the step of controlling the duration of the incubating of the step of incubating to control the degree of cross linking of the cross-linked collagen.

Furthermore, in accordance with another preferred embodiment of the present invention, the method further includes the step of controlling the concentration of the sugar used in the step of incubating to control the degree of cross linking of the cross-linked collagen.

Furthermore, in accordance with another preferred embodiment of the present invention, the method further includes the step of controlling the concentration of the hydrophilic solvent used in the step of incubating to control the degree of cross linking of the cross-linked collagen.

Furthermore, in accordance with another preferred embodiment of the present invention, the method further includes the step of removing at least some of the unreacted amount of the sugar, and removing at least some of the hydrophilic solvent.

Furthermore, in accordance with another preferred embodiment of the present invention, the method further includes the step of washing the cross-linked collagen to remove at least some of the unreacted amount of the sugar and to remove at least some of the hydrophilic solvent.

There is also provided, in accordance with another preferred embodiment of the present invention, a method for preparing cross-linked collagen. The method includes the step of incubating collagen in a solution including water, at least one polar solvent and D(−)Ribose.

Furthermore, in accordance with another preferred embodiment of the present invention, the polar solvent is selected from the group consisting of methanol, ethanol, propanol, isopropanol acetone, tetrahydrofuran, dimethylsulfoxide, and combinations thereof.

Furthermore, in accordance with another preferred embodiment of the present invention, the collagen is selected from, native collagen, fibrillar collagen, fibrillar atelopeptide collagen, lyophylized collagen, collagen obtained from animal sources, human collagen, recombinant collagen, pepsinized collagen, reconstituted collagen, and combinations thereof.

Furthermore, in accordance with another preferred embodiment of the present invention, the collagen includes fibrillar collagen reconstituted from monomolecular atelopeptide collagen.

Furthermore, in accordance with another preferred embodiment of the present invention, the collagen is atelopeptide fibrillar collagen obtained by reconstituting monomolecular atelopeptide collagen obtained by proteolytic digestion of native collagen.

Furthermore, in accordance with another preferred embodiment of the present invention, the concentration of D(−)ribose in the solution is in the range of 0.1%–5% (w/v).

Furthermore, in accordance with another preferred embodiment of the present invention, the concentration of D(−)ribose in the solution is in the range of 0.5%–3% (w/v).

Furthermore, in accordance with another preferred embodiment of the present invention, the solution includes water in the range of 15%–95% (v/v) and at least one polar solvent in the range of 5%–85% (v/v).

Furthermore, in accordance with another preferred embodiment of the present invention, the solution includes phosphate buffered saline in the range of 15%–95% (v/v) and at least one polar solvent in the range of 5%–85% (v/v).

Furthermore, in accordance with another preferred embodiment of the present invention, the solution is a buffered solution including a buffer.

Furthermore, in accordance with another preferred embodiment of the present invention, the solution includes phosphate buffered saline.

Furthermore, in accordance with another preferred embodiment of the present invention, the solution includes water in the range of 15%–95% (v/v), at least one polar solvent in the range of 5%–85% (v/v), and a buffer.

There is also provided, in accordance with another preferred embodiment of the present invention, a method for preparing cross-linked collagen, the method includes the step of incubating reconstituted atelopeptide fibrillar collagen in a solution including water, at least one polar solvent and at least one reducing sugar.

Furthermore, in accordance with another preferred embodiment of the present invention, solution is a buffered solution.

There is also provided, in accordance with another preferred embodiment of the present invention, a method for preparing a cross-linked collagen having a desired resistance to degradation. The method includes the steps of incubating collagen in a solution including water, at least one polar solvent, and at least one sugar, and controlling the duration of incubating the collagen to obtain cross-linked collagen having a desired resistance to degradation.

There is also provided, in accordance with another preferred embodiment of the present invention, a method for preparing a cross-linked collagen having a desired resistance to degradation. The method includes the steps of incubating collagen in a solution including water, at least one polar solvent, and at least one sugar, and selecting the concentration of the polar solvent to obtain cross-linked collagen having a desired resistance to degradation.

There is also provided, in accordance with another preferred embodiment of the present invention, a method for preparing a cross-linked collagen having a desired resistance to degradation. The method includes the steps of incubating collagen in a solution including water, at least one polar solvent and at least one sugar, and selecting the concentration of the sugar used in the step of incubating to obtain cross-linked collagen having a desired resistance to degradation.

There is also provided, in accordance with another preferred embodiment of the present invention, an improved cross-linked fibrillar collagen matrix obtained by a process for its preparation from fibrillar collagen. The process includes the steps of providing a matrix including reconstituted fibrillar collagen, and incubating the matrix in a solution including water, at least one polar solvent and at least one sugar, for cross-linking the fibrillar collagen to form a cross-linked fibrillar collagen matrix.

Furthermore, in accordance with another preferred embodiment of the present invention, the matrix is in the form of an implantable device.

Furthermore, in accordance with another preferred embodiment of the present invention, the implantable device is a collagen based membrane barrier for guided tissue regeneration.

Furthermore, in accordance with another preferred embodiment of the present invention, the process used for preparing the matrix further includes the step of washing the cross-linked collagen matrix after the step of incubating to remove at least some of the polar solvent and unreacted excess of the sugar.

Furthermore, in accordance with another preferred embodiment of the present invention, the process further includes the step of dehydrating the cross-linked fibrillar collagen matrix.

Furthermore, in accordance with another preferred embodiment of the present invention, the process used for preparing the matrix further includes the step of subjecting the cross-linked fibrillar collagen matrix to critical point drying.

Furthermore, in accordance with another preferred embodiment of the present invention, the process used for preparing the matrix further includes the step of drying or freeze-drying the cross-linked fibrillar collagen matrix.

Furthermore, in accordance with another preferred embodiment of the present invention, the fibrillar collagen comprises fibrillar collagen reconstituted from monomolecular atelopeptide collagen.

Finally, in accordance with another preferred embodiment of the present invention, the fibrillar collagen is prepared by reconstituting monomolecular atelopeptide collagen obtained by proteolytic digestion of native collagen.

BRIEF DESCRIPTION OF THE DRAWINGS

In order to understand the invention and see how it may be carried out in practice, several preferred embodiments will now be described, by way of non-limiting example only, with reference to the accompanying drawings.

DETAILED DESCRIPTION OF THE INVENTION

Figure 1A:
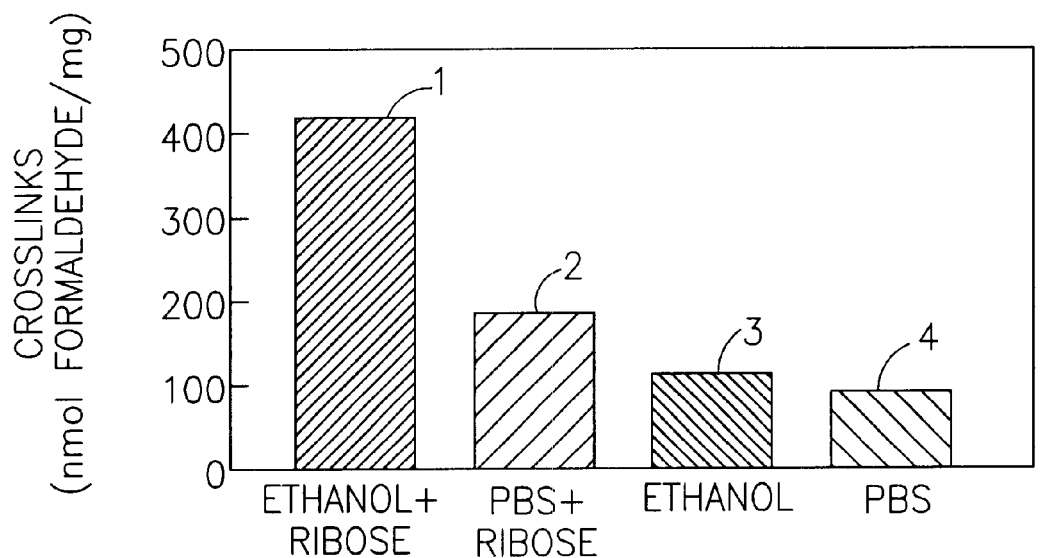
FIG. 1A is a schematic bar diagram illustrating the glycation level of four samples of particulate collagen preparation subjected to different experimental treatments.

The present invention discloses a novel method for the preparation of atelopeptide reconstituted collagen cross-linked with reducing sugars such as D(−)Ribose. The method overcomes the inability of D(−)Ribose to induce stable cross-linking of atelopeptide reconstituted collagen matrices and improves the capacity of D(−)Ribose to cross-link native or reconstituted collagen matrices. The method allows for precisely controlling the rate of bio-degradation of the D(−)Ribose cross linked collagen matrices formed by the method.

In the method disclosed by Pitaru et al. in U.S. Pat. No. 5,955,438, the specification of which is incorporated herein by reference in its entirety, the inventors have disclosed cross-linking of fibrillar collagen matrices in aqueous buffered ribose solutions followed by the process of critical point drying for preserving the three dimensional shape of implants based on collagen matrices cross-linked by D(−) Ribose. The use of a critical point drying step after the step of cross-linking by incubation in aqueous ribose solution was found to improve the resistance to collagenase of the resulting cross-linked collagen matrices.

The inventors of the present invention have found that if a polar solvent, such as but not limited to, ethanol in a concentration range of approximately 30–85% (v/v) is included in the buffered solution of D(−)Ribose in which the collagen was incubated in the cross-linking step, the degradation resistance (determined as the resistance to degradation by bacterial collagenase) of the resulting cross-linked collagen was surprisingly and unexpectedly improved compared to the degradation resistance of the cross-linked collagen matrix obtained by incubating the collagen matrices in D(−)Ribose in phosphate buffered saline (PBS).

Another unexpected finding was that the degradation resistance of cross-linked collagen incubated in the alcoholic D(−)Ribose solution was significantly higher than the degradation resistance of a cross-linked collagen matrix obtained by incubating the collagen matrices in D(−)Ribose in phosphate buffered saline (PBS) followed by critical point drying (prepared as disclosed in U.S. Pat. No. 5,955,438).

EXAMPLE 1

Collagen matrices were prepared from collagen using the method disclosed in U.S. Pat. No. 5,955,438. Briefly, a solution of molecular purified pepsinized bovine Type I collagen (1–10 milligram/milliliter) prepared from bovine tendons commercially available from Pel-Freez, AR, U.S.A, dissolved in 0.01M HCl and maintained at 4° C. is neutralized by 0.1M NaOH to pH 7.2–7.4, poured into an appropriate mold, and incubated for 24 hours at a temperature ranging between 20–38° C. The matrix which is produced is then compressed by a piston to remove excess solution. The resulting collagen membranes were then subjected to the following five different treatment types:

Treatment group No. 1—the membranes in this group were incubated for 11 days in PBS.

Treatment group No. 2—the membranes in this group were incubated for 11 days in a 3% solution of D(-)Ribose in PBS.

Treatment group No. 3—the membranes in this group were incubated for 11 days in a 3% solution of D(-)Ribose in PBS. After the incubation, the membranes were washed several times in PBS to remove the D(-)Ribose. The membranes were then dehydrated in a series of ethanol solutions of increasing concentrations (30%–100% ethanol) and then subjected to critical point drying as disclosed in detail in column 7, lines 4–15 of U.S. Pat. No. 5,955,438.

Treatment group No. 4—the membranes in this group were incubated for 11 days in a solution including 30% (v/v) PBS, 70% (v/v) ethanol, and 3% (w/v) of D(-)Ribose.

Treatment group No. 5—the membranes in this group were incubated for 11 days in a solution including 30% (v/v) PBS, 70% (v/v) ethanol, and 3% (w/v) of D(-)Ribose. After the incubation, the membranes were washed several times in PBS to remove the D(-)Ribose. The membranes were then dehydrated in a series of ethanol solutions of increasing concentrations (70%–100% ethanol) and then subjected to critical point drying as disclosed in treatment No. 3 hereinabove.

After the above disclosed treatments were completed, all the membranes were tested for resistance to bacterial collagenase digestion. The test was performed by incubating the tested membranes in a solution including 350 units of bacterial collagenase per milliliter of degradation buffer for the indicated amount of time. The degradation buffer included 111 mM NaCl, 5.4 mM KCl, 1.3 mM $MgCl_2$, 0.5 mM $ZnCl_2$ and 21.3 mM Tris-base at pH=7.45. The bacterial collagenase is bacterial collagenase Cat. No. C-9891, commercially available from Sigma Chemical Co., MO, U.S.A. At the end of the collagenase assay the amount of digested and non-digested collagen in the supernatant and pellet were determined by a modified Lowry method as disclosed in a paper by Komsa-Penkova R. et al. entitled "MODIFICATION OF LOWRY'S METHOD FOR COLLAGEN CONCENTRATION MEASUREMENT.", published in J. Biochem. Methods Vol. 32 pp. 33–43, 1996. The amount of digested collagen is presented as the percentage of the total protein in each sample.

The results for the above described five treatment types are given in TABLE 1 below.

TABLE 1

| TREATMENT GROUP NO. | COLLAGENASE DIGESTION TIME | | |
| --- | --- | --- | --- |
| | 1 hour | 3 hours | 5 hours |
| 1 | 77% | 100% | 100% |
| 2 | 43% | 80% | 96% |
| 3 | 11% | 24% | 33% |
| 4 | 3% | 13% | 17% |
| 5 | 0% | 0% | 3% |

The values in TABLE 1 represent the amount of digested collagen as a percent of the total protein in the tested sample membrane at the specified time periods of incubation with collagenase. (100% indicates full digestion of the sample and 0% indicates no digestion at the indicated digestion time).

The results indicate that the degradation resistance of the membranes which were cross-linked by incubation with 3% (w/v) D(-)Ribose in a mixture of 70% ethanol and 30% PBS (Treatment group No. 4) was higher than the degradation resistance of membranes which were cross-linked by incubation with D(-)Ribose in PBS (Treatment group No. 2) and was also higher than the degradation resistance of membranes which were cross-linked by incubation with D(-)Ribose in PBS and subjected to dehydration and critical point drying (Treatment group No. 3).

It was also noted that when the membranes were cross-linked by incubation with 3% (w/v) D(-)Ribose in a mixture of 70% ethanol and 30% PBS and then subjected to dehydration and critical point drying (Treatment group No. 5), the degradation resistance was even further increased.

Thus, in accordance with one preferred embodiment of the present invention, collagen, or a collagen matrix, or a structure comprising a collagen or a collagen matrix is incubated in a buffered solution comprising a reactive (reducing) sugar and an alcohol and/or other hydrophilic organic solvent. Preferably, the incubation is performed at a temperature of 37° C. However, the incubation temperature may vary between 4°–60° C. Preferably, the incubation time may vary between 1–28 days, depending on the desired degree of cross-linking. However, other different incubation times may also be used depending, inter alia, on the required degree of degradation resistance.

Preferably, the sugar is introduced into the incubation mixture by being dissolved in a buffered saline solution, such as, for example, PBS. However, it may be possible to use other suitable buffers or buffered saline solutions, known in the art, in order to control the pH and/or the ionic strength of the incubation solution.

Preferably, the alcohol concentration in the incubation mixture or solution is between 50%–75% (v/v). However, the alcohol concentration may be varied between 5%–85%. The preferred concentration of reducing sugar is between 0.5%–3% (w/v). However, the concentration of reducing sugar may vary between 0.15% to 6%. Nevertheless, other different concentrations of alcohol and/or reducing sugar may also be used, depending, inter alia, on the incubation temperature, and other reaction conditions, such as the pH level and the like, and on the desired degradation resistance of the product.

Generally, according to one embodiment of the present invention, the cross-linking of the collagen matrix of the present invention is performed as follows. First, a fibrillar collagen preparation or matrix is prepared according to one of the methods of preparing collagen matrices or collagen fibrillar preparations which is known in the art. The collagen may be prepared by any of the methods known in the art or disclosed in any of the above referenced U.S. Patents for preparing collagen may be used. including shown in the bellow described examples. The collagen matrix is incubated in a aqueous neutral buffered solution including ethanol and D(-)Ribose. The ethanol concentration is preferably about 70% (v/v), but may be in the range of approximately 30%–85%(v/v), and the D(-)Ribose concentration is preferably 1% (w/v), but may be in the range of approximately 0.5%–3% (w/v). The incubation time period is determined according to the desired level of cross-linking. Typically a 14 days incubation period may be used, but the incubation time period may vary in the range of approximately 1–21 days.

EXAMPLE 2

This example discloses the preparation of Injectable collagen matrices cross-linked by an ethanol-ribose solution.

A fibrillar collagen matrix is prepared from pepsinized bovine tendon Type I collagen as disclosed in detail in EXAMPLE 1 hereinabove. The cold acidic collagen solution (at pH 3 and a collagen concentration of 3 mg/ml) is neutralized with an alkali phosphate buffer, warmed to 37° C. and vigorously stirred for 24 hours. The continuous stirring results in the formation of small particles in the range of 150 micron. The fibrillar collagen particulate matrix obtained after 24 hours of incubation at 37° C. is centrifuged to precipitate the collagen particles. The supernatant is removed and the pellet washed several times in phosphate buffered saline (PBS) by repeated centrifugation and re-suspension.

Samples of particulate collagen matrix prepared as described above were divided into four groups. Each group received one of the four different treatments:

Group A—The particulate collagen matrix was incubated for 14 days in a solution including 70% (v/v) ethanol, 30% (v/v) PBS and 3% (w/v) D(-)Ribose.

Group B—The particulate collagen matrix was incubated for 14 days in a solution 3% (w/v) D(-)Ribose dissolved in PBS.

Group C—The particulate collagen matrix was incubated for 14 days in a solution including 70% (v/v) ethanol, and 30% (v/v) PBS.

Group D—The particulate collagen matrix was incubated for 14 days in PBS.

Following the incubation period the samples were analyzed for glycation level. The number of ribose residues represents the assumed number of intermolecular cross-links and is expressed by the amount of formaldehyde released by reduction from 1 mg of cross-linked collagen. The assay method was used as described by Tanaka S., Avigad G., Eikenberry E. F., and Brodsky B., in a paper entitled "ISOLATION AND PARTIAL CHARACTERIZATION OF COLLAGEN CHAINS DIMERIZED BY SUGAR-DERIVED CROSS-LINKS." Published in J. Biol. Chem. Vol. 263 pp. 17650–17657 (1988) and by Avigad G. in a paper entitled "A SIMPLE SPECTROPHOTOMETRIC DETERMINATION OF AND OTHER FORMALDEHYDE ALDEHYDES: APPLICATION TO PERIODATE-OXIDIZED GLYCOL SYSTEMS." Published in Anal. Biochem. Vol.134, pp.499–504 (1983).

The same samples were also analyzed for degradation by bacterial collagenase as disclosed in detail for EXAMPLE 1 hereinabove. The collagenase concentration used in the assay was 300 collagenase Units/ml of degradation buffer, and the incubation time in collagenase was 3 hours.

Reference is now made to FIG. 1A which is a bar diagram illustrating the effect of the four different incubation treatments of groups A–D on the number of intermolecular cross-links in the samples represented as nanomoles formaldehyde formed per milligram sample. The vertical bar labeled 1 represents the results for Group A of EXAMPLE 2, the vertical bar labeled 2 represents the results for Group B of EXAMPLE 2, the vertical bar labeled 3 represents the results for Group C of EXAMPLE 2, and the vertical bar labeled 4 represents the results for Group D of EXAMPLE 2. Each bar of FIG. 1A represents the mean of three separate measurements and the capped bars represent the standard deviation of the mean.

The number of cross-links of the particulate collagen matrix incubated in ethanol (Group C of EXAMPLE 2) was roughly similar to the number of cross-links observed for the control particulate matrix incubated in PBS (Group D of EXAMPLE 2). The number of cross-links in the particulate collagen incubated in a solution 3% D(-)Ribose dissolved in PBS (Group B of EXAMPLE 2) was approximately twofold higher than the number of cross-links of the particulate matrix incubated in PBS only (Group D of EXAMPLE 2). The number of cross-links in the particulate collagen treated with 3% D(-)Ribose dissolved in the solution including 70% ethanol and 30% PBS (Group A of EXAMPLE 2) was approximately fourfold higher than that of the particulate collagen incubated in PBS or in 70% ethanol, and 30%PBS without ribose (Groups D and C, respectively, of EXAMPLE 2) and was 2.26 higher than number of cross-links of particulate collagen incubated in 3% D(-)Ribose dissolved in PBS (Group B of EXAMPLE 2).

Figure 1B:
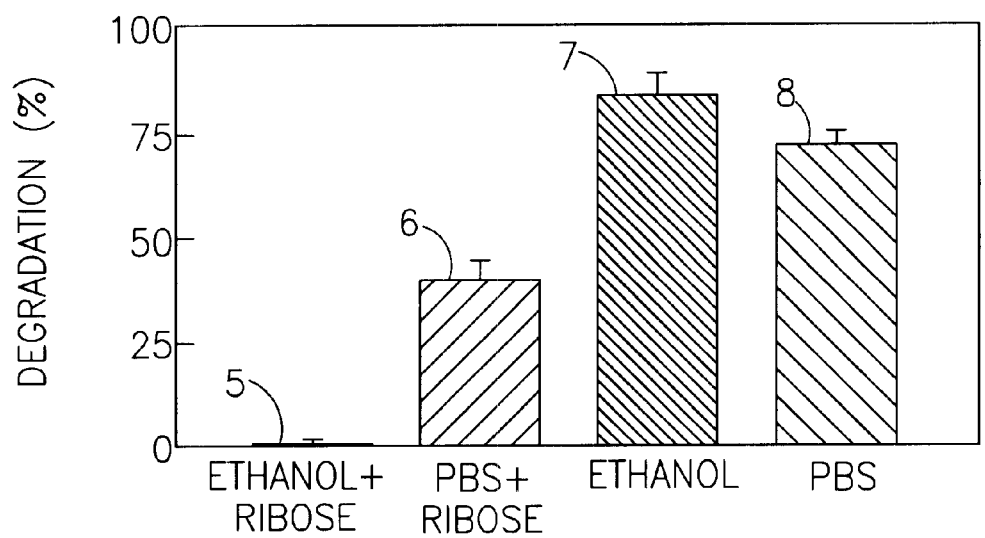
FIG. 1B is a schematic bar diagram illustrating the percent degradation by bacterial collagenase of four samples of particulate collagen preparation subjected to the same four different experimental treatments as the corresponding samples of FIG. 1A.

Reference is now made to FIG. 1B which is a schematic bar diagram illustrating the effect of the four different incubation treatment types of groups A–D of EXAMPLE 2 disclosed hereinabove on the resistance of the particulate collagen to degradation by bacterial collagenase. The resistance to bacterial collagenase degradation was determined as disclosed for EXAMPLE 1 hereinabove.

In FIG. 1B, the vertical bar labeled 5 represents the results for Group A of EXAMPLE 2, the vertical bar labeled 6 represents the results for Group B of EXAMPLE 2, the vertical bar labeled 7 represents the results for Group C of EXAMPLE 2, and the vertical bar labeled 8 represents the results for Group D of EXAMPLE 2. Each bar of FIG. 1B represents the mean of three separate measurements and the capped bars represent the standard deviation of the mean.

The results illustrated in FIG. 1B demonstrate that incubation in 70% ethanol and 30% PBS (Group C of EXAMPLE 2) had no substantial effect on the resistance to bacterial collagenase degradation which was similar to the resistance to bacterial collagenase degradation of the control samples incubated in PBS only (Group C of EXAMPLE 2). The results indicate that the particulate collagen incubated in 3% ribose in the presence of 70% ethanol and 30% PBS (Group A of EXAMPLE 2) was approximately 20 fold more resistant to bacterial collagenase degradation than the particulate collagen incubated in 3% D(-)Ribose in the presence of PBS (Group B of EXAMPLE 2), and 35 to 40 fold more resistant to bacterial collagenase degradation than the particulate collagen incubated either in PBS only or in 70% ethanol and 30% PBS (Groups D and C, respectively, of EXAMPLE 2).

When the temperature and the concentrations of the reducing sugar and alcohol are maintained constant, increasing the incubation time results in an increase in the number of cross-links and in the resistance of the collagen matrix to bacterial collagenase degradation.

Figure 2A:
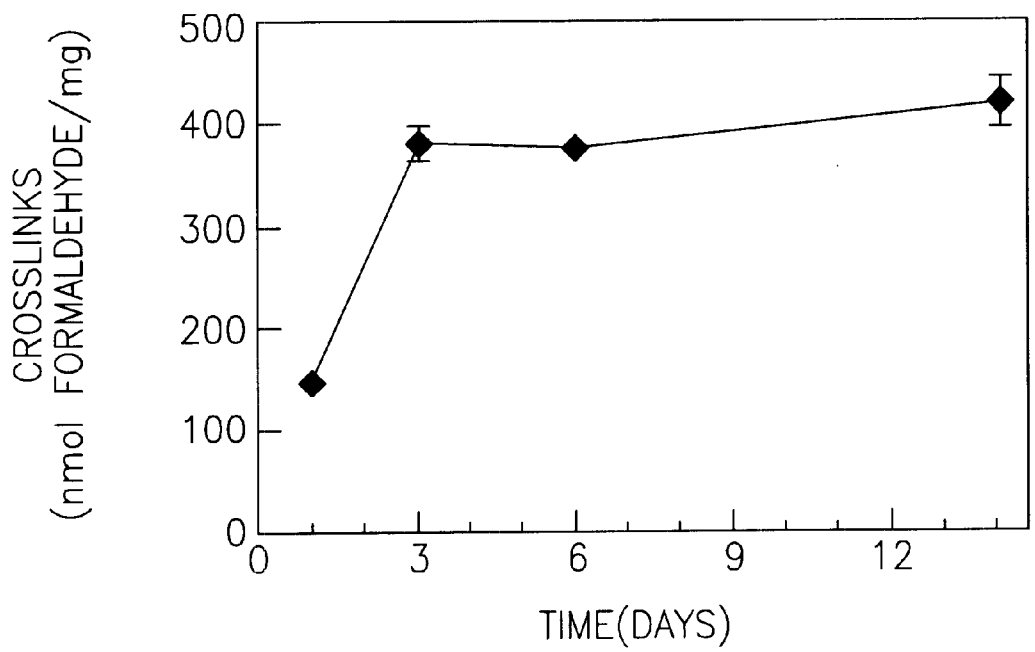
FIGS. 2A and 2B are schematic graphs illustrating the effect of incubation time on the glycation level and on the collagenase degradation resistance, respectively, of collagen matrices incubated in a solution containing ethanol and D(−)Ribose.
Figure 2B:
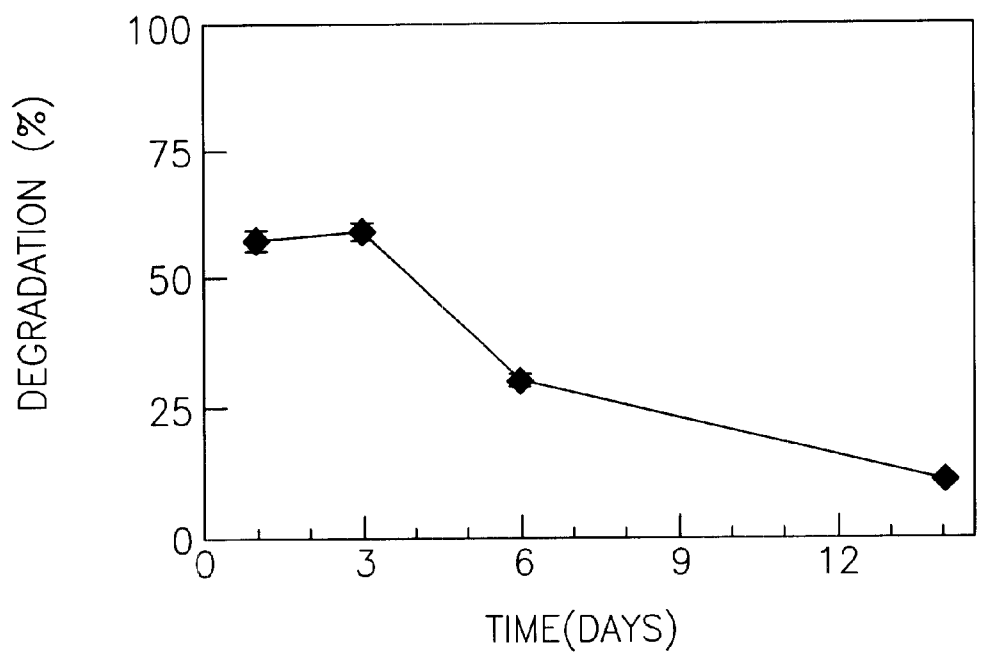

Reference is now made to FIGS. 2A and 2B which are schematic graphs illustrating the effect of incubation time on the glycation level and the collagenase degradation, respectively, of collagen matrices incubated in a solution containing ethanol, PBS and D(-)Ribose.

A particulate collagen matrix was prepared as described in EXAMPLE 2 hereinabove. The prepared collagen matrix was then incubated in a solution of 3% (w/v) of D(-)Ribose in a solution including 30% (v/v) of PBS, and 70% (v/v) of ethanol for 1, 3, 9 and 14 days. At each time point the matrix was assayed for the level of glycation (FIG. 2A) and for the capacity of the matrix to resist digestion by bacterial collagenase (FIG. 2B) by using the glycation level and the collagenase degradation assays disclosed hereinabove.

In FIGS. 2A and 2B, the horizontal axis represents the incubation time in days. The vertical axis of FIG. 2A represents the glycation level (expressed as nanomoles of formaldehyde released by reduction from one milligram of collagen). The vertical axis of FIG. 2B represents the amount of digested collagen as a percent of the total protein in the sample. The points in FIGS. 2A and 2B represent the mean value of the glycation level and the collagenase degradation values, respectively, at the various incubation times. The capped bars represent the standard deviation of the mean (n=3). Thus, when the temperature, the sugar concentration and the ethanol concentration are maintained constant, increasing the incubation time, results in an increase in the number of cross-links and in the resistance of the collagen matrix to collagenase degradation.

Figure 3:
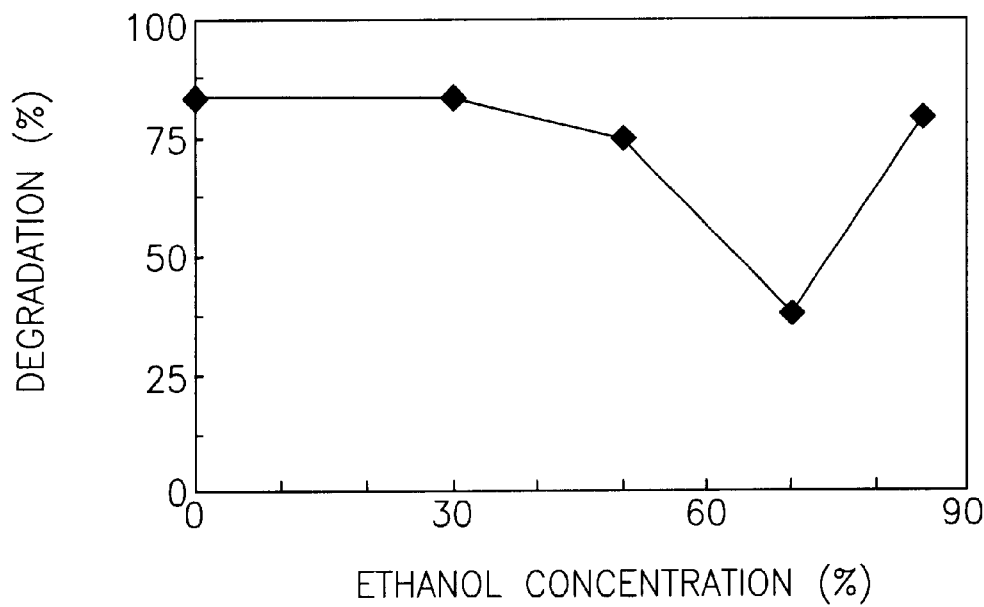
FIG. 3 is a schematic graph illustrating the effect of ethanol concentration during cross-linking on the degradation by bacterial collagenase of collagen matrices cross-linked by D(−)Ribose solutions containing ethanol.

Reference is now made to FIG. 3 which is a schematic graph illustrating the effect of ethanol concentration during cross-linking on the degradation by bacterial collagenase of collagen matrices cross-linked by D(−)Ribose in the presence of solutions including PBS and various ethanol concentrations. Particulate collagen matrix samples were prepared as described in detail in EXAMPLE 2 hereinabove and incubated for 6 days in solutions of 3% (w/v) of D(−)Ribose dissolved in PBS containing 0%, 30%, 50%, 70% and 85% (all percentages are given as v/v) of ethanol. At the end of the incubation period the matrix samples were assayed for capacity to resist bacterial collagenase digestion as described in detail hereinabove. The horizontal axis represent the ethanol concentration (% v/v) in the PBS containing incubation medium. The vertical axis represents % degradation expressed as the amount of digested collagen as a percent of total sample collagen. The results indicate that under the particular cross-linking reaction conditions, the ethanol concentration yielding the highest resistance to collagenase degradation is in the range of approximately 50% to 85%. It is noted that increasing the ethanol concentration beyond 70% reduces the resistance to collagenase degradation as can be seen from the results of the sample incubated in 85% ethanol. Thus, when the temperature, the sugar concentration and the incubation time are maintained constant, increasing the alcohol concentration up to a certain optimal concentration, results in an increase in the number of cross-links and in the resistance of the collagen matrix to collagenase degradation.

Figure 4:
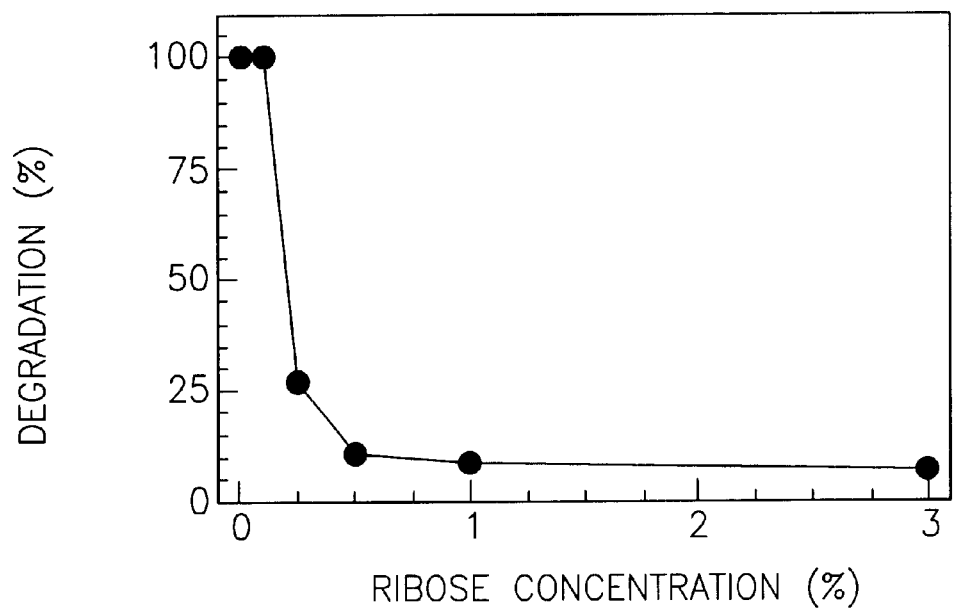
FIG. 4 is a schematic graph illustrating the effect of D(−)Ribose concentration during cross-linking on the degradation by bacterial collagenase of collagen matrices cross-linked by D(−)Ribose solutions containing ethanol.

Reference is now made to FIG. 4 which is a schematic graph illustrating the effect of D(−)Ribose concentration during cross-linking on the degradation by bacterial collagenase of collagen matrices cross-linked by ethanolic D(−) Ribose solutions. Particulate collagen matrix samples were prepared as described in detail in EXAMPLE 2 hereinabove and incubated for 14 days in solutions having ascending D(−)Ribose concentrations in 70% (v/v) ethanol and 30% (v/v) PBS. At the end of the incubation period the matrix samples were assayed for capacity to resist bacterial collagenase digestion as described in detail hereinabove. The horizontal axis represent the D(−)Ribose concentration (% w/v) in the incubation solutions. The vertical axis represents % degradation expressed as the amount of digested collagen as a percent of the total collagen matrix sample. The results demonstrate that under the particular cross-linking reaction conditions, increasing the concentration of D(−)Ribose in the range of 0.1%–3%, increases the resistance to degradation by bacterial collagenase of the cross-linked collagen matrix. Thus, when the temperature, the incubation time and the ethanol concentration are maintained constant, increasing the reducing sugar concentration results in an increase in the number of cross-links and in the resistance of the collagen matrix to collagenase degradation.

The cross-linking method disclosed hereinabove is also effective in increasing the level of cross-linking and the degradation resistance of a commercially available collagen preparation intended for skin augmentation as demonstrated in EXAMPLE 3 hereinbelow.

EXAMPLE 3

Zyderm® is an injectable, highly concentrated pepsinized atelopeptide bovine dermal preparation derived from dermal bovine skin. The collagen material may be injected and is supposed to form fibrils in vivo following injection or implantation.

Zyderm®1, is manufactured by Collagen Corporation, Palo Alto, Calif., U.S.A, and is commercially available from Collagen Esthetics, Inc., CA, USA. The Zyderm®1 material (at a concentration of approximately 35 milligram per milliliter) was divided into 3 groups of samples that were subjected to treatment as follows:

Group 1—1 milliliter of Zyderm®1 was mixed with 20 milliliter of PBS and incubated for 14 days (this is a control group).

Group 2—1 milliliter of Zyderm®1 was mixed with 20 milliliter of 3% D(−)Ribose dissolved in PBS and incubated for 14 days.

Group 3—1 milliliter of Zyderm®1 was mixed with 20 milliliter of 3% D(−)Ribose dissolved in a solution including 30% (v/v) of PBS, and 70% (v/v) of ethanol and incubated for 14 days.

All groups were incubated at 37° C.

At the end of the incubation period the samples were assayed for resistance to collagenase degradation as described in detail in EXAMPLE 2 hereinabove. The collagenase concentration used in the assay was 300 collagenase units/ml of degradation buffer, and the incubation time in collagenase was 3 hours.

The results are given in TABLE 2 below. The amount of solubilized (degraded) collagen is presented as percent of total protein in each sample. The results are given as Mean±standard deviation (n=3).

TABLE 2

| TREATMENT TYPE | Collagenase degradation (% of total collagen) |
|---|---|
| GROUP 1 (Control) | 72 ± 17 |
| GROUP 2 (3% ribose in PBS) | 54 ± 16 |
| GROUP 3 (3% ribose in 70% ethanol, and 30% PBS) | 14 ± 11 |

The results in TABLE 2 are expressed as the amount of digested collagen as a percent of the total collagen in the tested sample. The results demonstrate that incubation with 3% of D(−)Ribose dissolved in a solution including 30% PBS and 70% ethanol is approximately 4 times more potent in cross-linking the Zyderm®1 material than incubation in 3% D(−)Ribose dissolved in PBS.

Treating of Zyderm® 1 with 3% D(−)Ribose dissolved in a solution including 70% ethanol and 30% PBS increased the capacity of this material to withstand bacterial collagenase degradation by 5 times (TABLE 2).

The injectable collagen preparations prepared by the method of the present invention, such as but not limited to the injectable material prepared as described in EXAMPLE 2 and EXAMPLE 3 above, may be utilized for a variety of purposes including, inter alia, tissue augmentation in cosmetics, urology, gastroenterology, ottolaryngology, orthopedics and other fields of medicine, and controlled delivery of drugs, proteins, hormones and genomic material.

The present invention may also be applied for the utilization of the collagen matrices cross-linked by an ethanol-ribose solution in the preparation of shaped implantable collagen matrices.

EXAMPLE 4

This example demonstrates the application of the cross-linking method of the present invention to pre-formed sheets of collagen matrices. Collagen sheets were prepared from bovine pepsinized atelopeptide momomeric collagen solution as disclosed hereinabove. Briefly, the fibrillar collagen matrix is prepared by neutralizing a cold acidic collagen solution (pH 3; 3 mg/ml) with an alkali phosphate buffer and warming the solution to 37° C. in an appropriate mold. The fibrillar collagen lattice formed by the polymerization of the monomeric solution is then compressed by using a suitable piston or any other suitable compressing device, to give the desired form and collagen content per volume unit while the liquid is squeezed out of the lattice. Collagen disks having a diameter of approximately 3 centimeters and approximately 0.5 millimeter thickness, were formed as described above and were incubated in three different incubation solutions for 11 days. A first group of pre-formed collagen sheets was incubated in PBS. A second group of pre-formed collagen sheets was incubated in a solution of 3% D(-) Ribose in PBS. A third group of pre-formed collagen sheets was incubated in a solution of 3% (w/v) of D(-)Ribose in 70% (v/v) ethanol, and 30% (v/v) PBS. At the end of the incubation period the three groups of pre-formed collagen sheets were dehydrated and subjected to critical point drying as disclosed hereinabove and assayed for their resistance to bacterial collagenase degradation as disclosed in EXAMPLE 1 hereinabove. The collagenase concentration used in the assay was 350 collagenase Units/ml of degradation buffer, and the incubation time in collagenase was 5 hours.

The results are given in TABLE 3 below indicate that the sheets cross-linked in D(-)Ribose dissolved in the ethanol/PBS mixture were substantially more resistant to bacterial collagenase degradation than those sheets incubated in D(-)Ribose dissolved in PBS.

TABLE 3

| Cross-linking conditions | Collagenase degradation (% of total collagen) |
|---|---|
| PBS | 95 |
| 3% D(-)Ribose in PBS | 29 |
| 3% Ribose in 70% Ethanol + 30% PBS | 18 |

Generally, in accordance with a preferred embodiment of the invention, A shaped article such as a sheet, a tube, or any other shaped article is prepared from a fibrillar collagen matrix as disclosed in detail hereinabove. The collagen matrix is gradually dehydrated in a series of aqueous ethanol solutions of increasing ethanol concentrations the highest of which is 70% ethanol. The mold-shaped, or otherwise shaped collagen matrix article is then incubated in an aqeuous solution of 3% D(-)Ribose containing 70% ethanol. The desired amount of cross-linking is obtained by varying the incubation time. As disclosed hereinabove and illustrated in FIGS. 2A–2B, the longer the incubation time the higher the degree of resistance of the collagen matrix to bacterial collagenase digestion. After the desired degree of cross-linking is obtained the matrix can either be hydrated in a series of ethanol solutions of decreasing concentration. Alternatively, the formed collagen matrix may be further dehydrated and subjected to critical point drying as described in detail in U.S. Pat. No. 5,955,438 to Pitaru et al. If the first alternative is taken, the matrix may be preserved and stored in a wet environment prior to implantation or other uses. If the second alternative is taken then the dried collagen matrix may be preserved and stored in a dry state.

The collagen matrix that may be cross-linked by the method disclosed herein may take any form known in the art. For example, sheets, tubes, sponges, flakes, gels, beads, microspheres and other related geometrical forms made of any of the collagen types disclosed hereinabove may be cross-linked by the method of the present invention. According to an embodiment of this invention, the collagen of the matrix may be chemically and/or physically modified with agents such as pharmaceuticals, other proteins, or synthetic polymers.

It is noted that the exact concentration of D(-)Ribose, the ethanol concentration, and any of the other cross-linking conditions such as but not limited to the incubation time and incubation temperature may be varied if desired to control the final degradation properties of the implant or article made from the collagen matrix. Such controlled variations enable, inter alia, the forming of implants and other collagen based articles having controlled in-vivo degradation resistance.

EXAMPLE 5

While the examples disclosed hereinabove of the cross-linked collagen prepared using the cross-linking method of the present invention, involve the use of bovine collagen preparations, the cross-linked collagen of the present invention may be applied to collagen from other different sources. In the two experiments presented hereinbelow the cross-linking method of the present invention is applied to two different forms of human collagen.

Experiment 1

Human Achilles tendon was treated with ficin to remove non-collagenous proteins as is known in the art. The tendon was cut into small pieces (1–2 $mm^2$) and than divided into 4 groups of samples. A first group of samples was incubated in PBS for 14 days as the control group. A second group of samples was incubated in a solution of 3% D(-)Ribose in PBS for 14 days. A third group of samples was incubated in a solution of 3% (w/v) of D(-)Ribose in a mixture of 30% (v/v) PBS and 70% (v/v) ethanol for 6 days. A fourth group of samples was incubated in a solution of 3% D(-)Ribose in a mixture of 30% (v/v) PBS and 70% (v/v) ethanol for 14 days.

Experiment 2

Dermalogen™ commercially available from Collagenesis Inc, MA, USA, is an injectable collagen matrix derived from human skin after removal of the non-collagenous proteins and is used as an off-the-shelf allogeneic implant material. Dermalogen™ collagen matrix was divided into 4 groups of samples. A first group of Dermalogen™ samples was incubated in PBS for 14 days as the control group. A second group of Dermalogen™ samples was incubated in a solution of 3% D(-)Ribose in PBS for 14 days. A third group of Dermalogen™ samples was incubated in a solution of 3% (w/v) of D(-)Ribose in a mixture of 30% (v/v) PBS and 70% (v/v) ethanol for 6 days. A fourth group of Dermalogen™ samples was incubated in a solution of 3% (w/v) D(-)Ribose in a mixture of 30% (v/v) PBS and 70% (v/v) ethanol for 14 days.

At the end of the cross-linking period, all the samples of Experiment 1 and Experiment 2 were assayed for resistance to collagen degradation by bacterial collagenase as disclosed in detail in EXAMPLE 1 hereinabove. The collagenase concentration used in the assay was 350 collagenase Units/ml of degradation buffer, and the incubation time in collagenase was 5 hours.

The results are given in TABLE 4 below.

TABLE 4

| Cross-linking conditions | Collagenase degradation (% of total collagen) | |
| --- | --- | --- |
| | EXPERIMENT 1. (human Achilles tendon) | EXPERIMENT 2. (Drmalogen ®) |
| PBS for 14 days (control) | 38.2 ± 0.7 | 79.5 ± 2.6 |
| 3% D(−)Ribose in PBS for 14 days | 13.1 ± 0.3 | 75.4 ± 1.0 |
| 3% D(−)Ribose in ethanol (70%) and PBS (30%) for 6 days | 14.5 ± 0.3 | 44.2 ± 1.2 |
| 3% D(−)Ribose in ethanol (70%) and PBS (30%) for 14 days | 0.8 ± 0.2 | 11.2 ± 0.1 |

The collagenase degradation results in TABLE 4 is presented as the amount of solubilized collagen as percent of total protein in each sample. The results are presented as mean values±the standard deviation of the mean (n=3). The results in TABLE 4 demonstrate that the cross-linking method of the invention is applicable to collagen obtained from different sources. The results in TABLE 4 also demonstrate that incubation of the human collagen in the 3% D(−)Ribose in 70% ethanol, and 30% PBS increases the capacity of the cross-linked deproteinized human collagen samples to withstand collagenolytic degradation several fold compared to the human collagen samples that were incubated for the same amount of time in 3% D(−)Ribose in PBS. The amount of degraded collagen in the human Achilles tendon samples incubated in the 3% D(−)Ribose in 70% ethanol and 30% PBS was approximately 16 fold less than the amount of degraded collagen in the human Achilles tendon samples incubated in the 3% D(−)Ribose in PBS. Similarly, the amount of degraded collagen in the Dermalogen™ samples incubated in the 3% D(−)Ribose in 70% ethanol and 30% PBS, was approximately 7 fold less than the amount of degraded collagen in the Dermalogen™ samples incubated in the 3% D(−)Ribose in PBS.

Generally, the cross-linking method of the present invention may be applied to different types of collagen matrices of different sources which may be prepared from molecular solutions of collagen by reconstitution as described in detail hereinabove or by removal of non-collagenous proteins and proteoglycans from tissue comprising collagen matrices. Examples of such tissues are blood vessels, skin, pericardium, tendons, ligaments, bones, fascia, capsules, cornea, sclera, intestines, and the like. These tissues may be obtained from different species, including but not limited to bovine, porcine, human, and the like. The removal of the non-collagenous proteins and proteoglycans may be performed by enzymatic digestion and extractions as is known in the art. After the deproteinizing step, the remaining collagen matrix is cross-linked in an aqueous buffered ethanolic D(−)Ribose solution according to the methodology described in the examples disclosed hereinabove.

The collagen which may be cross-linked by the method of the present invention may be native collagen fibers that were prepared by completely or partially extracting from collagen containing tissues the cellular components and/or the non-collagenous proteins. The method may also be used to cross-link reconstituted fibrils of native (non-pepsinized) collagen molecules. The method may also be used for cross-linking reconstituted atelopeptide collagen fibrils. Furthermore, combinations of the above disclosed collagen forms may also be cross-linked by the method of the present invention.

In accordance with different preferred embodiments of the present invention, the collagen matrices may be cross-linked in order to render them suitable for different applications such as, but not limited to, extracellular matrix scaffolds in tissue engineering, controlled delivery systems for pharmaceuticals and biologics (active proteins, genes and gene vectors), membranes for guided tissue and bone regeneration, injectable or implantable bulking agents for tissue augmentation, envelopes for anchoring natural and/or reconstructed and/or artificial organs, filler material for the preparation of artificial tissues or organs such as for example artificial breast, and component of composites materials comprising of collagen and other natural or artificial polymeric structures or natural or synthetic organic and inorganic compounds or combinations of these.

Examples of starting materials for the preparation of the collagen matrices and preparations of the present invention are animal and human rich collagen tissues such as skin, bone, tendons, ligaments, placenta, and the like, and recombinant collagens prepared in vitro or in transgenic organisms. The collagen matrix may comprise a single type of collagen but may also comprise mixtures of a variety of collagen types known in the art. Examples of collagen types which may be used in the preparation of the cross-linked collagen preparations and/or collagen matrices of the present invention are collagen types I–XVIII which are known in the art.

Other examples of other types of collagen molecules which may be used in the preparation of the cross-linked collagen preparations and/or collagen matrices of the present invention are collagenous proteins such as for example the cementum derived attachment protein (CAP) which promotes the attachment and spreading of periodontal cell types, as disclosed in an article by Komaki et al. entitled "Role of MAP Kinases p42(erk-2)/p44(erk-1) in cementum-derived attachment protein mediated cell attachment" published in Journal of Dental Research, Vol. 79 (10) pp. 1789–1793 (2000)., incorporated herein by reference in it's entirety, and other collagenous molecules known in the art, or modified collagen-like peptides such as, but not limited to, the collagen-like peptides disclosed by Kramer et al. in the paper entitled "STAGGERED MOLECULAR PACKING IN CRYSTALS OF A COLLAGEN-LIKE PEPTIDE WITH A SINGLE CHARGED PAIR" published in J. Mol. Biol, 301(5), pp. 1191–1205, September 2000, incorporated herein by reference in its entirety for all purposes, or the collagen-like peptides disclosed by Kramer et al. in the paper entitled "SEQUENCE DEPENDENT CONFORMATIONAL VARIATIONS OF COLLAGEN TRIPLE-HELICAL STRUCTURE" published in Nat. Struct. Biol, 6(5), pp. 454–457, May 1999, incorporated herein by reference in its entirety for all purposes.

The preparation of solutions of collagen suitable for cross-linking using the method of the present invention is known in the art. Commercial collagen products such as Zyderm®, Dermalogen™, or other similar products that are in the form of collagen solutions and/or native and/or reconstituted fibrillar collagen matrices are also useful as collagen starting material for cross-linking by the method of the present invention. Exemplary methods for the preparation of various types of collagen matrices which are suitable for being cross-linked by the method of the present invention are disclosed, inter alia, in U.S. Pat. No. 4,703,108, U.S. Pat. No. 4,060,081, U.S. Pat. No. 4,418,691, U.S. Pat. No. 4,374,121, U.S. Pat. No. 4,703,108, U.S. Pat. No. 4,409,332, and U.S. Pat. No. 4,971,954 the specification of each of the above referenced U.S. Patents is incorporated herein by reference in its entirety.

Preferably, D(−)Ribose is used for cross-linking of the collagen. However, other examples of reactive sugars which may also be used for cross-linking according to the method of the present invention are glycerose, threose, erythrose, lyxose, xylose, arabinose, allose, altose, glucose, manose, gulose, idose, galactose, fructose, talose, or any other diose, triose, tetrose, pentose, hexose, septose, octose, nanose, or decose.

It is noted that other alcohols different than ethanol, and other polar or hydrophylic organic solvents may also be used in the cross-linking method of the present invention.

EXAMPLE 6

Additional experiments were performed to evaluate the effects of various different reducing sugars on the resistance to degradation by collagenase of collagen samples cross-linked in the presence of 70% ethanol.

A fibrillar collagen matrix is prepared from pepsinized, bovine tendon, Type I collagen as disclosed in detail in EXAMPLE 1 hereinabove. The cold acidic collagen solution (at pH 3 and a collagen concentration of 3 mg/ml) is neutralized with an alkali phosphate buffer, warmed to 37° C. and vigorously stirred for 24 hours. The continuous stirring results in the formation of small particles in the range of 150 micron. The fibrillar collagen particulate matrix obtained after 24 hours of incubation at 37° C. is centrifuged to precipitate the collagen particles. The supernatant is removed and the pellet washed several times in phosphate buffered saline (PBS) by repeated centrifugation and re-suspension.

5 equal portions, each including 5 milligrams of the above resuspended fibrillar collagen particulate matrix were incubated at 37° C. for 11 days in 30 milliliters of a solution including 70% ethanol (v/v), 30% PBS (v/v), and 1% (w/v) of a reducing sugar. The different reducing sugars tested in the presence of 70% ethanol were D(−)Ribose, commercially available as Catalogue Number R7500 from Sigma Chemical Co., MO, U.S.A., D(−) Glucose, commercially available as Catalogue Number 10117 from BDH Chemicals, Poole UK, D(−) Fructose, commercially available as Catalogue Number 47740 from Fluka Chemie, AG, Switzerland, Sucrose (α-D-glucopyranosyl-β-D-fructose), commercially available as Catalogue Number 10274 from BDH Chemicals, Poole U K, and Maltose (4-O-αD-glucopyranosyl-D-glucose), commercially available as Catalogue Number M5885 from Sigma Chemical Co., MO, U.S.A.

At the end of the incubation period with the different types of sugars, the treated collagen samples were collected by centrifugation, washed three times in PBS, and tested for resistance to bacterial collagenase digestion, as disclosed in detail in EXAMPLE 2 hereinabove. The collagenase concentration used in the assay was 300 collagenase Units/ml of degradation buffer, and the incubation time in collagenase was 3 hours.

The results of the experiment are given in TABLE 5 below. The right column of TABLE 5 indicates the type of sugar in which the collagen sample was incubated. The numbers in the left column of TABLE 5 represent the amount of solubilized (degraded) collagen, presented as percent of total protein in each sample.

TABLE 5

| Sugar used | Collagenase Degradation (% of total collagen) |
|---|---|
| D(−)Ribose | 17 |
| D(−)Glucose | 95 |
| D(−)Fructose | 98 |
| Sucrose | 92 |
| Maltose | 95 |

As can be seen from the results presented in TABLE 5, D(−)Ribose had the highest efficacy in improving the resistance to degradation by collagenase of the fibrillar collagen cross-linked by the sugar. The efficacy of the other sugars is lower than the efficacy of D(−)Ribose.

It is noted that while only the disaccharides sucrose and maltose were tested in EXAMPLE 6, it may be possible to use other disaccharides, such as but not limited to, lactose, cellobiose, gentiobiose, melibiose, turanose, and trehalose, for cross-linking collagen by using appropriate incubation times and conditions.

EXAMPLE 7

Additional experiments were performed to evaluate the effects of various different organic solvents on the cross-linking of collagen with various reducing sugars.

A suspension of particulate fibrillar collagen matrix was prepared from pepsinized, bovine tendon, Type I collagen as disclosed in detail in EXAMPLE 6 hereinabove. Ten collagen samples (5 milligrams collagen in each sample) were prepared. Each of the collagen samples was incubated for 11 days at 37° C. in 30 milliliters of a solvent mixture containing 30% (v/v) of PBS, 70% (v/v) of an organic solvent, and 1% (w/v) of D(−)Ribose. The organic solvents tested were: ethanol, methanol, 1-propanol, 2-propanol (isopropanol), 1-butanol, 1-hexanol, acetone (dimethyl ketone), dimethyl sulfoxide (DMSO), ethyl acetate, and tetrahydrofuran (THF).

In a control experiment, a sample of 5 milligrams collagen was incubated for 11 days at 37° C. in a solution of 1% (w/v) of D(−)Ribose in PBS (sample number 1 of TABLE 6 below).

At the end of the incubation period, the collagen samples incubated in the presence of 1-butanol, 1-hexanol, acetone and ethyl acetate (samples 6, 7, 8 and 10, respectively, of TABLE 6 below) were washed twice with 70% ethanol in PBS to remove the organic solvent. The collagen of all of the samples was then collected by centrifugation, and all the samples were washed three times in PBS. Aliquotes of all the samples were then assayed for resistance to degradation by Trypsin as disclosed in detail hereinafter, and for resistance to degradation by collagenase as disclosed in detail in EXAMPLE 2 hereinabove. The collagenase concentration used in the collagenase degradation assay was 300 collagenase Units/ml of degradation buffer, and the incubation time in collagenase was 3 hours.

TABLE 6

| Sample Number | Solvent Used | Collagenase Degradation (% of total collagen) | Trypsin Resistance |
|---|---|---|---|
| 1 | PBS | 72 | Intact |
| 2 | Ethanol | 17 | Intact |
| 3 | Methanol | 22 | Intact |
| 4 | 1-Propanol | 32 | Intact |
| 5 | 2-propanol | 37 | Intact |
| 6 | 1-Butanol | ** | Degraded |
| 7 | 1-Hexanol | ** | Degraded |
| 8 | Acetone | 9 | Intact |
| 9 | DMSO | 9 | Intact |
| 10 | Ethyl Acetate | ** | Degraded |
| 11 | THF | 43 | Intact |

Wherein ** denotes that during the incubation period, in sample numbers 6,7 and 10 of TABLE 6 which included 1-Butanol, 1-Hexanol and Ethyl-acetate, respectively, a phase including the organic solvent separated from the aqueous solution (the fibrillar collagen appeared as a separate aqueous phase in the samples, and some solid appeared in the interface between the organic solvent layer and the aqueous phase. In samples 6,7 and 10 of TABLE 6, after the organic solvent was washed with ethanol and deposited by centrifugation, the collagen appeared as a solid yellowish packed deposit, different in appearance from the whitish emulsion like appearance of the centrifuged pellet of the remaining test samples (sample numbers 1–5, 8, 9, and 11 of TABLE 6), in which no organic solvent phase was observed during the incubation period. It is assumed that the less polar solvents 1-Butanol, 1-Hexanol, and Ethyl Acetate, which have lower water miscibility, probably caused denaturation of the collagen. This assumption may be corroborated by the fact that the trypsin degradation resistance assay results showed that the collagen samples treated with 1-Butanol, 1-Hexanol, and Ethyl Acetate (sample numbers 6, 7, and 10, respectively, of TABLE 6) were degraded by trypsin.

Typically, native, non-denatured collagen should be resistant to non-specific proteolytic digestion by trypsin, while denatured collagen is degraded by digestion with trypsin. Thus, the trypsin resistance assay results of TABLE 6 may indicate the degree of denaturation of the collagen samples tested.

Trypsin Digestion Testing Procedure 100 milliliters of reaction Buffer stock solution was prepared by mixing 2 milliliters of 10 mM HCl with 98 milliliters of a phosphate buffer including a 67 mM of sodium phosphate adjusted to pH 7.6.

Trypsin (commercially available as Catalogue Number T8003 from Sigma Chemical Co., MO, U.S.A) was dissolved in the reaction buffer solution to yield a trypsin solution having an activity of 2000 units of trypsin per milliliter of reaction buffer.

The trypsin resistance assay was performed as follows: collagen samples having a volume of 100 microliters were placed in pre-weighted test tubes. The collagen was spun down at 13,000 g for two minutes and the supernatant was discarded. The test tubes were weighed again and the pellet weight was determined by subtraction, and the volume of the pellet was roughly determined by marking the height (level) of the pellet with a marker on the test tube. The digestion was started by adding 0.5 milliliter of the above disclosed solution of trypsin in the reaction buffer to the collagen pellet in each of the test tubes, and the tubes were incubated at 25° C. for 24 hours. After the incubation was completed, the test tubes were centrifuged at 13,000 g for two minutes and the volume of the pellet was roughly determined by marking as disclosed hereinabove. The test tubes were weighted again to determine the weight of the pellets (by subtraction). The pellets were also visually examined before and after the digestion to determine their appearance and size.

In the rightmost column of TABLE 6, the word "intact" indicates that the weight and volume of the collagen pellet spun down from the sample after 24 hours of trypsin digestion did not differ by more than ±25% from the weight and volume, respectively, of the collagen pellet spun down from the same sample prior to the addition of the trypsin solution. The word "degraded" indicates that weight and volume of the collagen pellet spun down from the sample after 24 hours of trypsin digestion differed by more than −25% from the weight and volume, respectively, of the collagen pellet spun down from the same sample prior to the addition of the trypsin solution.

It is noted that the collagen samples treated with 1-Butanol, 1-Hexanol, and Ethyl Acetate (sample numbers 6, 7 and 10, respectively, of TABLE 6) were completely degraded by trypsin after 24 hours incubation with trypsin solution, such that after 24 hours in the trypsin solution no visually observable pellet was spun down.

The collagenase degradation assay results of TABLE 6 indicate that of the solvents that did not cause substantial denaturation of the collagen in the samples, the order of efficacy in increasing the collagenase degradation resistance of the D(−)ribose treated collagen samples was DMSO≈Acetone>Ethanol>Methanol>Propanol>Isopropanol>THF.

It appears that the solvents, such as for example ethyl acetate, 1-butanol, and 1-hexanol, which were less polar and which separated as a second phase distinct from the aqueous phase (i.e. solvents which were not completely miscible in the aqueous phase, caused denaturation of the collagen.

Thus, preferably, the solvent or solvents used in the cross-linking medium should be a polar solvent (or a mixture of polar solvents) which is completely miscible in the aqueous phase in which the collagen is reacted with the sugar.

The results summarized in TABLE 6 indicate that incubating collagen with D(−)ribose in buffered aqueous solutions containing polar solvents increased the collagenase degradation resistance of the resulting collagen compared to collagen incubated in PBS only. The results also indicate that while relatively polar, water miscible alcohols (such as for example, ethanol methanol, propanol and isopropanol) are useful in increasing the collagenase degradation resistance of the collagen samples incubated with D(−)ribose, other polar solvents which are chemically different than alcohols may also be used with similar or even greater efficacy.

EXAMPLE 8

The following experiment was performed to check the effect of the concentration of D(−)Ribose on the collagenase degradation resistance of collagen cross-linked with D(−) Ribose in the presence of 70% acetone (dimethyl ketone).

A suspension of particulate fibrillar collagen matrix was prepared from pepsinized, bovine tendon, Type I collagen as disclosed in detail in EXAMPLE 6 hereinabove. Five collagen samples, each sample including 5 milligrams of collagen, were prepared. Each collagen sample was incubated for 11 days at 37° C. in 30 milliliters of a solution comprising 70% (v/v) acetone and 30% (v/v) PBS, and a specified concentration of D(−)Ribose. The final concentrations of D(−)Ribose in the five different solutions tested were 0.5%, 1%, 2%, 3%, and 5% (the D(−)Ribose concentrations are expressed as w/v). At the end of the incubation period the collagen was collected by centrifugation, washed three times in PBS to remove the acetone, and the samples were tested for collagenase degradation resistance as disclosed in detail in EXAMPLE 2 hereinabove. The collagenase concentration used in the collagenase degradation assay was 300 collagenase Units/ml of degradation buffer, and the incubation time in collagenase was 3 hours.

The results of the experiments of EXAMPLE 8 are given in TABLE 7 below.

TABLE 7

| D(−)Ribose Concentration % (w/v) | Collagenase degradation (% of degraded collagen) |
| --- | --- |
| 0.5 | 11 |
| 1 | 9 |
| 2 | 2 |
| 3 | 1 |
| 5 | 4 |

The results of TABLE 7 indicate that under the specific incubation conditions used, the maximal degradation resistance of the cross linked collagen, in the presence of 70% acetone is achieved at a D(−)ribose concentration in the approximate range of 1–3% (w/v).

EXAMPLE 9

The following experiment was performed to check the effect of the concentration of D(−)ribose on the collagenase degradation resistance of collagen cross-linked with D(−)ribose in the presence of 70% dimethylsulfoxide (DMSO).

A suspension of particulate fibrillar collagen matrix was prepared from pepsinized, bovine tendon, Type I collagen as disclosed in detail in EXAMPLE 6 hereinabove. Five collagen samples, each sample including 5 milligrams of collagen, were prepared. Each collagen sample was incubated for 11 days at 37° C. in 30 milliliters of a solution comprising 70% (v/v) DMSO and 30% (v/v) PBS, and a specified concentration of D(−)Ribose. The final concentrations of D(−)Ribose in the five different solutions tested were 0.5%, 1%, 2%, 3%, and 5% (the D(−)Ribose concentrations are expressed as w/v). At the end of the incubation period the collagen was collected by centrifugation, washed three times in PBS to remove the DMSO, and the samples were tested for collagenase degradation resistance as disclosed in detail in EXAMPLE 2 hereinabove. The collagenase concentration used in the collagenase degradation assay was 300 collagenase Units/ml of degradation buffer, and the incubation time in collagenase was 3 hours.

The results of the experiments of EXAMPLE 9 are given in TABLE 8 below.

TABLE 8

| D(−)Ribose Concentration % (w/v) | Collagenase degradation (% of degraded collagen) |
| --- | --- |
| 0.5 | 11 |
| 1 | 9 |
| 2 | 14 |
| 3 | 20 |
| 5 | 59 |

The results of TABLE 8 indicate that under the specific incubation conditions used, the maximal degradation resistance of the cross linked collagen in the presence of 70% DMSO is achieved at a D(−)ribose concentration in the approximate range of 0.5%–2% (w/v).

EXAMPLE 10

The experiments of EXAMPLE 10 were performed to determine the relative efficacy of different D(−)glucose concentrations in cross linking collagen in the presence of four different polar organic solvents.

A suspension of particulate fibrillar collagen matrix was prepared from pepsinized, bovine tendon, Type I collagen as disclosed in detail in EXAMPLE 6 hereinabove. Four collagen samples, each sample including 5 milligrams of collagen, were incubated for 11 days at 37° C. in 30 milliliters of four different incubation mixtures, each incubation mixture included 70% (v/v) of a specified organic polar solvent, 30% (v/v) of PBS, and 1% (w/v) of D(−) glucose. The four different organic solvents were ethanol, methanol acetone and DMSO.

Four additional collagen samples were prepared. Each sample included 5 milligrams of collagen. The additional four samples were incubated for 11 days at 37° C. in 30 milliliters of four different incubation mixtures, each incubation mixture included 70% (v/v) of a specified organic polar solvent, 30% (v/v) of PBS, and 5% (w/v) of D(−) glucose. The four different organic solvents were ethanol, methanol acetone and DMSO.

At the end of the incubation period, the collagen of all the eight collagen samples was collected by centrifugation, washed three times in PBS to remove the organic solvent, and the collagen samples were tested for collagenase degradation resistance as disclosed in detail in EXAMPLE 2 hereinabove. The collagenase concentration used in the collagenase degradation assay was 300 collagenase Units/ml of degradation buffer, and the incubation time in collagenase was 3 hours.

The results of the experiments of EXAMPLE 9 are given in TABLE 9 below.

TABLE 9

| | Collagenase Degradation (% of total collagen) | |
| --- | --- | --- |
| SOLVENT | Sample cross-linked At a D(−) glucose concentration of 1% (w/v) | Sample cross-linked At a D(−) glucose concentration of 5% (w/v) |
| Ethanol | 97 | 95 |
| Methanol | 97 | 98 |
| Acetone | 95 | 98 |
| DMSO | 95 | 98 |

As may be seen from the results in TABLE 9, D(−)glucose at concentrations of 1% and 5% in the presence of 70% of one of the polar solvents ethanol, methanol acetone, and DMSO, may be less efficient than D(-) ribose in increasing the degradation resistance of collagen. However, it may be possible to increase the incubation period in the presence of D(-)glucose beyond the 11 days used in EXAMPLE 10 order to increase the collagenase degradation resistance.

EXAMPLE 11

A solution of molecular purified pepsinized bovine Type I collagen (2.5 milligram/milliliter) was prepared from bovine tendons commercially available from Pel-Freez, AR, U.S.A, dissolved in 0.01M HCl and maintained at 4° C. A sample volume of 40 milliliters of the solution including 100 milligrams of collagen was dialyzed against a volume of 4.0 liters of 0.1M acetic acid for two days at 4° C. At the end of the dialysis period, the dialysed collagen sample was lyophilized (freeze-dried) in a commercial Lyophilizer yielding a white, sponge-like mass of freeze-dried non-fibrillar collagen.

Four samples (sample 1–4 of TABLE 10 below) of approximately 5 milligrams of the freeze-dried non-fibrillar collagen were put in test tubes, and treated as follows:

Sample 1—was incubated for 12 days in a solvent mixture including 70% (v/v) of ethanol, and 30%(v/v) of PBS.

Sample 2—was incubated for 12 days in a solvent mixture including 70% (v/v) of ethanol, 30%(v/v) of PBS, and 1% D(-)Ribose (w/v).

Sample 3—was incubated for 6 days in a solvent mixture including 70% (v/v) of ethanol, 30%(v/v) of PBS, and 1% D(-)Ribose (w/v).

Sample 4—was left untreated. This sample was used as a control sample.

At the end of the specified incubation periods the incubated samples were drained (except for sample 4 which was not initialy incubated), and washed three times in PBS. Each of the four samples was then divided into three approximately equal portions, and the three portions of each of the samples were then assayed for collagenase degradation at incubation times of 1 hour, 3 hours and 5 hours, as disclosed in detail in EXAMPLE 1, hereinabove. The collagenase concentration used in the collagenase degradation assay was 350 collagenase Units/ml of degradation buffer.

The results of the experiments of EXAMPLE 11 are given in TABLE 10 below.

TABLE 10

| SAMPLE NUMBER AND TREATMENT TYPE | COLLAGENASE DEGRADATION (%) | | |
|---|---|---|---|
| | 1 HOUR DIGESTION | 3 HOURS DIGESTION | 5 HOURS DIGESTION |
| SAMPLE 1 | | | |
| Ethanol + PBS, 12 DAYS | 42% | 85% | 100% |
| SAMPLE 2 | | | |
| Ethanol + PBS +1% D(-) Ribose 12 DAYS | 12% | 18% | 28% |
| SAMPLE 3 | | | |
| Ethanol + PBS +1% D(-) Ribose 6 DAYS | 10% | 40% | 63% |
| SAMPLE 4 | | | |
| Untreated (control) | 84% | 100% | 100% |

The numbers in TABLE 10 represent the amount of digested collagen as a percent of the initial sample weight.

The results of EXAMPLE 11 indicate that non-fibrillar collagen may also be effectively cross-linked by the method of the present invention. The lyophilized collagen formed as disclosed hereinabove was not reconstituted into fibrillar collagen (as was the case with the collagen membranes described in EXAMPLE 1) due to the acidity of the solution which was maintained prior to the lyophilization. Nevertheless, the non-fibrillar lyophilized collagen prepared as disclosed in EXAMPLE 11 was also cross-linked by the method of the present invention which significantly increased it's collagenase degradation resistance. This indicates that the presence of collagen fibrils is not mandatory, and that other forms of collagen besides the fibrillar form may be treated using the method of the present invention to increase their collagenase degradation resistance.

Generally, the method of the present invention may be implemented using a variety of different reducing sugars or reducing sugar derivatives presented by one of the following formulae I or II (as disclosed in detail in U.S. Pat. No. 4,971,954 to Brodsky et al., and in U.S. Pat. No. 5,955,438 to Pitaru et al.).

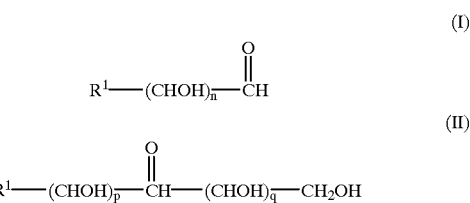

wherein:
$R^1$ is H or lower alkyl or alkylene, an amino acid, a peptide, a saccharide, a purine or a pyrimidine base, a phosphorylated purine or pyrimidine base, n is an integer between 2–9, and p and q are each independently an integer between 0–8, provided that the sum of p and q is at least 2 and not more than 8.

It will be appreciated by those skilled in the art that the various compounds having the general formulae I or II hereinabove may have exhibit different reaction rates in cross-linking collagen and that the cross-linked products may exhibit various different degrees of degradation resistance.

It will also be appreciated that various modifications to the above-described embodiment will be apparent to those of ordinary skill in the art in light thereof. The above embodiments are provided by way of illustration and not by way of limitation. For example, while a single polar solvent is used in the specific examples and experiments disclosed hereinabove, the method of the present invention is not limited to the use of a single polar solvent. Many different combinations of various polar solvents may thus be used. For example, It may be possible to perform the cross linking of collagen in the presence of water and more than one polar solvent. In a non-limiting example, an aqueous (buffered or non-buffered) mixture of acetone and ethanol may be used, in another non-limiting example, a quaternary mixture of water (or buffer, or saline), ethanol, propanol and DMSO may be used. The use of aqueous mixtures of a plurality of different polar solvents may be advantageous in cases were one would like to fine tune the degradation resistance of the resulting cross-linked collagen preparation, since the use of an aqueous mixture including a plurality of polar solvents may facilitate the fine tuning and control of the degree of degradation resistance of the cross-linked collagen preparation.

Similarly, those skilled in the art will appreciate that the present invention is not limited to the use of a single reducing sugar or reducing sugar derivative (such as one or more of the compounds having the formulae I or II disclosed hereinabove) for cross linking. Thus, the cross-linked fibrillar collagen preparations of the present invention may also be produced by incubation of fibrillar collagen with a mixture of one or more reducing sugars in an mixture of water and one or more polar solvent. For example, in accordance with one non-limiting example, fibrillar collagen may be incubated with a solution of 70% ethanol and 30% water including 1.5% D(-)Ribose and 3% D(-)Glucose. In another non-limiting example fibrillar collagen may be incubated with a solution of 35% ethanol, 35% acetone and 30% PBS including 1.0% D(-)Ribose and 3% D(-)Glucose. It is noted that the use of different reducing sugar combinations may be advantageous since it may allow finer control of the degradation resistance of the final cross-linked collagen preparation. Thus, the use of such sugar mixtures and solvent mixtures need not necessarily provide higher degradation resistance to the final cross-linked collagen preparation but may allow finer control of product properties.

It is further noted that while phosphate buffered saline (PBS) was the buffered saline used for performing the collagen cross-linking in the experiments, other different buffers or buffered salines or buffer solutions for regulating the pH and/or the ionic strength of the cross-linking incubation solutions may also be used to implement the methods of the present invention.

REFERENCES OF INTEREST

1. Bailey A J, Sims T J, Avery N C, Halligan E P. Non-enzymic Glycation of Fibrous Collagen: Reaction Products of Glucose and Ribose. *Biochem J.* 1995; 305: 385–390.
2. Sell D R, Monnier V M. Structure Elucidation of a Senescence Cross-link from Human Extracellular Matrix. *The Journal of Biological Chemistry.* 1989; 264(36): 21597–21602.
3. Tanaka S, Avigad G, Brodsky B, Eikenberry E F. Glycation Induces Expansion of the Molecular Packing of Collagen. *J Mol Biol.* 1988; 203: 495–505.
4. Tanaka S, Avigad G, Eikenberry E F, Brodsky B. Isolation and Partial Characterization of Collagen Chains Dimerized by Sugar-derived Cross-links. *The Journal of Biological Chemistry.* 1988; 263(33): 17650–17657.
5. Yue D K, McLennan S, Delbridge L, Handelsman D J, Reeve T, Turtle J R. The Thermal Stability of Collagen in Diabetic Rats: Correlation with Severity of Diabetes and Non-Enzymatic Glycosylation. *Diabetologia.* 1983; 24:282–285.
6. Pachence J M. Collagen-based devices for soft tissue repair. *Journal of Biomedical Material Research.* 1996; 33: 35–40.
7. Rao K R. Recent developments of collagen-based materials for medical applications and drug delivery systems. *J Biomater. Sci. Polymer Edn* 1995; 7:633–645.
8. Krauss M C. Recent advances in soft tissue augmentation. *Seminars in Cutaneous Medicine and Surgery* 1999; 2:119–128.
9. Monnier V M et al. Accelerated age-related browning of human collagen in diabetes mellitus *Proc Natl Acad Sci USA* 1984; 81:583–587.
10. Kent M J, Light N D, Bailey A J. Evidence of glucose mediated cross-links after glycosylation in vitro. *Biochem J* 1985; 225:745–752.
11. Hegewald M G et al. Ribose infusion accelerates thallium redistribution with early immaging compared with late 24 hours without ribose. *J. Am. Coll. Cardioll.* 1991; 18:1671–1681.
12. Lehninger A H. Stucture and Catalysis in: *Principle of Biochemistry,* edit: Lehninger A H, Nelson D L, Cox M M, 1993, Worth Publishers.
13. Nimni M E, Harkness R D. Molecular structure and functions of collagen: in Collagen edit Nimni M E, CRC Press 1988.
14. Friess W. Collagen—biomaterial for drug delivery *Eur. J. Pharm Biopharm.* 1998; 45:113–136.
15. Bailey A J, Paul R G, Knott L. Mechanisms of maturation and ageing of collagen. *Mechanisms of ageing and development* 1998; 106:1–56.
16. Gelman R A, Poppke D C, Piez K A. Collagen fibril formation in vitro: The role of the nonhelical terminal regions. *Journal of Biological Chemistry.* 1979; 254:11741–11745.

What is claimed is:

1. A method for preparing cross-linked collagen having improved resistance to collagenase degradation, the method comprising the step of incubating collagen in a cross-linking solution comprising water, at least one polar solvent different than water and at least one sugar, to form cross-linked collagen.

2. The method according to claim 1 wherein said at least one sugar is a reducing sugar.

3. The method according to claim 1 wherein said at least one polar solvent comprises at least one organic polar solvent.

4. The method according to claim 3 wherein said at least one organic polar solvent is an alcohol.

5. The method according to claim 3 wherein said at least one organic polar solvent is selected from the group consisting of methanol, ethanol, propanol, isopropanol acetone, teftahydrofuran, dimethylsulfoxide, and combinations thereof.

6. The method according to claim 1 wherein said at least one polar solvent is miscible in water.

7. The method according to claim 1 wherein said solution is a buffered solution comprising a buffer.

8. The method according to claim 1 wherein said solution comprises phosphate buffered saline.

9. The method according to claim 1 wherein said solution comprises water in the range of 15%–95% (v/v), said at least one polar solvent in the range of 5%–85% (v/v), and a buffer.

10. The method according to claim 1 wherein said collagen is selected from, native collagen, fibrillar collagen, fibrillar atelopeptide collagen, lyophylized collagen, collagen obtained from animal sources, human collagen, recombinant collagen, pepsinized collagen, reconstituted collagen, and combinations thereof.

11. The method according to claim 1 wherein said collagen comprises fibrillar collagen reconstituted from monomolecular atelopeptide collagen.

12. The method according to claim 1 wherein said collagen is obtained by reconstituting monomolecular atelopeptide collagen obtained by proteolytic digestion of native collagen.

13. The method according to claim 1 wherein said at least one sugar is a compound represented by one of the following formulae I or II:

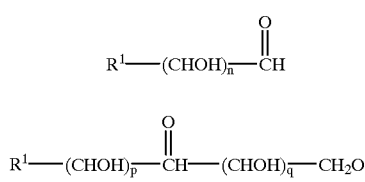

wherein:
R$^1$ is H or lower alkyl or alkylene, an amino acid, a peptide, a saccharide, a purine or a pyrimidine base, a phosphorylated purine or pyrimidine base;
n is an integer between 2–9, and
p and q are each independently an integer between 0–8, and the sum of p and q is at least 2 and not more than 8.

14. The method according to claim 1 wherein said at least one sugar is a naturally occurring reducing sugar.

15. The method according to claim 1 wherein said at least one sugar is selected from a group consisting of a diose, a triose, a tetrose, a pentose, a hexose, a septose, an octose, a nanose, and a decose.

16. The method according to claim 1 wherein said at least one sugar is selected from the group consisting of glycerose, threose, erythrose, lyxose, xylose, arabinose, ribose, allose, altrose, glucose, mannose, gulose, idose, galactose and talose.

17. The method according to claim 1 wherein said at least one sugar is a disaccharide.

18. The method according to claim 17 wherein said disaccharide is selected from the group consisting of maltose, lactose, sucrose, cellobiose, gentiobiose, melibiose, turanose, and trehalose.

19. The method according to claim 1 wherein at least one substance is added to the solution in which said step of incubating is performed, said at least one substance becoming immobilized within said matrix.

20. The method according to claim 19 wherein said at least one substance is selected from the group consisting of an antimicrobial agent, an anti-inflammatory agent, a factor having tissue inductive properties, and combinations thereof.

21. The method according to claim 1 wherein said at least one sugar is D(−)ribose, and said at least one polar solvent is ethanol.

22. The method according to claim 21 wherein said solution comprises water in the range of 15%–95% (v/v) and ethanol in the range of 5%–85% (v/v).

23. The method according to claim 21 wherein said solution comprises water in the range of 25%–50% (v/v) and ethanol in the range of 50%–75% (v/v).

24. The method according to claim 21 wherein said solution comprises about 30% water (v/v), and about 70% ethanol (v/v).

25. The method according to claim 21 wherein the concentration of D(−)ribose in said solution is in the range of 0.1%–5% (w/v).

26. The method according to claim 21 wherein the concentration of D(−)ribose in said solution is in the range of 0.5%–3% (w/v).

27. The method according to claim 1 further comprising the step of washing said cross-linked collagen after said step of incubating to remove said at least one polar solvent and excess of said at least one sugar.

28. The method according to claim 1 further comprising the step of dehydrating said cross-linked collagen.

29. The method according to claim 28 further comprising the step of subjecting said cross-linked collagen to critical point drying.

30. The method according to claim 1 further comprising the step of drying or freeze-drying said collagen prior to said step of incubating.

31. The method according to claim 1 further comprising the step of drying or freeze-drying said cross-linked collagen.

32. A cross-linked collagen preparation prepared by the method of claim 1.

33. A method for preparing cross-linked collagen having improved resistance to collagenase degradation, the method comprising the step of incubating collagen in a cross-linking solution comprising water, at least one hydrophilic solvent different than water and at least one sugar to form said cross-linked collagen.

34. The method according to claim 33 wherein said step of incubating comprises setting the duration of said incubating of said collagen to control the degree of cross linking of said cross-linked collagen.

35. The method according to claim 33 wherein said step of incubating comprises setting the concentration of said at least one sugar used in said step of incubating to control the degree of cross linking of said cross-linked collagen.

36. The method according to claim 33 wherein said step of incubating comprises setting the concentration of said at least one hydrophilic solvent used in said step of incubating to control the degree of cross linking of said cross-linked collagen.

37. The method according to claim 33 further comprising the step of removing from said solution at least some of the unreacted amount of said at least one sugar, and removing at least some of said at least one hydrophilic solvent.

38. The method according to claim 33 further comprising the step of washing said cross-linked collagen to remove at least some of the unreacted amount of said at least one sugar and to remove at least some of said at least one hydrophilic solvent.

39. A method for preparing cross-linked collagen having improved resistance to collagenase degradation, the method comprising the step of incubating collagen in a cross-linking solution comprising water, at least one polar solvent different than water and D(−)Ribose.

40. The method according to claim 39 wherein said at least one polar solvent is selected from the group consisting of methanol, ethanol, propanol, isopropanol acetone, tetrahydrofuran, dimethylsulfoxide, and combinations thereof.

41. The method according to claim 39 wherein said collagen is selected from, native collagen, fibrillar collagen, fibrillar atelopeptide collagen, lyophylized collagen, collagen obtained from animal sources, human collagen, recombinant collagen, pepsinized collagen, reconstituted collagen, and combinations thereof.

42. The method according to claim 39 wherein said collagen comprises fibrillar collagen reconstituted from monomolecular atelopeptide collagen.

43. The method according to claim 39 wherein said collagen is atelopeptide fibrillar collagen obtained by reconstituting monomolecular atelopeptide collagen obtained by proteolytic digestion of native collagen.

44. The method according to claim 39 wherein the concentration of D(−)ribose in said solution is in the range of 0.1%–5% (w/v).

45. The method according to claim 39 wherein the concentration of D(-)ribose in said solution is in the range of 0.5%–3% (w/v).

46. The method according to claim 39 wherein said solution comprises water in the range of 15%–95% (v/v) and said at least one polar solvent in the range of 5%–85% (v/v).

47. The method according to claim 39 wherein said solution comprises phosphate buffered saline in the range of 15%–95% (v/v) and said at least one polar solvent in the range of 5%–85% (v/v).

48. The method according to claim 39 wherein said solution is a buffered solution comprising a buffer.

49. The method according to claim 39 wherein said solution comprises phosphate buffered saline.

50. The method according to claim 39 wherein said solution comprises water in the range of 15%–95% (v/v), at least one polar solvent in the range of 5%–85% (v/v), and a buffer.

51. A method for preparing cross-linked collagen having improved resistance to collagenase degradation, the method comprising the step of incubating reconstituted atelopeptide fibrillar collagen in a cross-linking solution comprising water, at least one polar solvent different than water and at least one reducing sugar.

52. The method according to claim 51 wherein said cross-linking solution is a buffered solution.

53. A method for preparing a cross-linked collagen having a desired resistance to degradation, the method comprising the steps of:

cross-linking collagen by incubating said collagen in a cross-linking solution comprising water, at least one polar solvent different than water and at least one sugar; and controlling the duration of said incubating to obtain cross-linked collagen having a desired resistance to degradation.

54. A method for preparing a cross-linked collagen having a desired resistance to degradation, the method comprising the steps of:

cross-linking collagen by incubating said collagen in a cross-linking solution comprising water, at least one polar solvent different than water and at least one sugar; and selecting the concentration of said at least one polar solvent in said cross-linking solution to obtain cross-linked collagen having a desired resistance to degradation.

55. A method for preparing a cross-linked collagen having a desired resistance to degradation, the method comprising the steps of:

cross-linking collagen in a cross-linking solution comprising water, at least one polar solvent different than water and at least one sugar; and selecting the concentration of said at least one sugar in said cross-linking solution to obtain cross-linked collagen having a desired resistance to degradation.

56. An improved cross-linked fibrillar collagen matrix obtained by a process for its preparation from fibrillar collagen, said process comprising the following steps:

providing a matrix comprising reconstituted fibrillar collagen; and incubating said matrix in a cross-linking solution comprising water, at least one polar solvent different than water and at least one sugar for cross-linking said fibrillar collagen to form a cross-linked fibrillar collagen matrix.

57. The matrix according to claim 56, in the form of an implantable device.

58. The matrix according to claim 57, wherein said implantable device is a collagen based membrane barrier for guided tissue regeneration.

59. The matrix according to claim 56 wherein said process further includes the step of washing said cross-linked collagen matrix after said step of incubating to remove at least some of said at least one polar solvent and unreacted excess of said at least one sugar.

60. The matrix according to claim 56 wherein said process further includes the step of dehydrating said cross-linked fibrillar collagen matrix after said step of incubating.

61. The matrix according to claim 56 wherein said process further includes the step of subjecting said cross-linked fibrillar collagen matrix to critical point drying.

62. The matrix according to claim 56 wherein said process further includes the step of drying or freeze-drying said cross-linked fibrillar collagen matrix.

63. The matrix according to claim 56 wherein said fibrillar collagen comprises fibrillar collagen reconstituted from monomolecular atelopeptide collagen.

64. The matrix according to claim 56 wherein said fibrillar collagen is prepared by reconstituting monomolecular atelopeptide collagen obtained by proteolytic digestion of native collagen.

65. The method according to claim 33 further comprising the step of removing from said cross-linking solution at least some of the unreacted amount of said at least one sugar, and removing at least some of said at least one polar solvent.

* * * * *

UNITED STATES PATENT AND TRADEMARK OFFICE
CERTIFICATE OF CORRECTION

PATENT NO.    : 6,682,760 B2
DATED         : January 27, 2004
INVENTOR(S)   : Noff et al.

It is certified that error appears in the above-identified patent and that said Letters Patent is hereby corrected as shown below:

<u>Column 17,</u>
Table 4, the word "Drmalogen®" should be replaced with the word -- Dermalogen® --.

<u>Column 22,</u>
Line 37, the words "the aqueous phase," should be replaced with the words -- the aqueous phase), --.

<u>Column 28,</u>
Line 41, the words "isopropanol acetone" should be replaced with the words -- isopropanol, acetone --.

<u>Column 30,</u>
Line 49, the words "isopropanol acetone" should be replaced with the words -- isopropanol, acetone --.

Signed and Sealed this

Twenty-seventh Day of September, 2005

JON W. DUDAS
*Director of the United States Patent and Trademark Office*